US009967386B2

(12) United States Patent
Ji et al.

(10) Patent No.: US 9,967,386 B2
(45) Date of Patent: May 8, 2018

(54) MOBILE DEVICE CONNECTED WITH EXTERNAL INPUT DEVICE AND CONTROL METHOD THEREOF

(71) Applicant: Samsung Electronics Co. Ltd., Suwon-si, Gyeonggi-do (KR)

(72) Inventors: Se-Jin Ji, Daegu (KR); Gyu-Cheol Choi, Gumi-si (KR); Kyung-Do Park, Gumi-si (KR); Dong-Yul Lee, Gumi-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 13/947,619

(22) Filed: Jul. 22, 2013

(65) Prior Publication Data

US 2014/0057621 A1   Feb. 27, 2014

(30) Foreign Application Priority Data

Aug. 23, 2012   (KR) ........................ 10-2012-0092194

(51) Int. Cl.
*G06F 1/16* (2006.01)
*G06F 3/0354* (2013.01)
*G06F 3/0481* (2013.01)
*H04M 1/725* (2006.01)

(52) U.S. Cl.
CPC ...... *H04M 1/72527* (2013.01); *G06F 1/1632* (2013.01); *G06F 3/03543* (2013.01); *G06F 3/04817* (2013.01); *G06F 2200/1637* (2013.01)

(58) Field of Classification Search
CPC ... H04M 1/72527; G06F 3/033; G06F 1/1632
See application file for complete search history.

(56) References Cited

U.S. PATENT DOCUMENTS

| 2001/0015718 | A1* | 8/2001 | Hinckley ................ A63F 13/06 345/156 |
| 2003/0065608 | A1* | 4/2003 | Cutler .................... G06Q 40/00 705/37 |
| 2003/0081016 | A1* | 5/2003 | Rahimzadeh ......... G06F 1/1626 715/864 |
| 2003/0201977 | A1* | 10/2003 | Hassig ................ G06F 3/03543 345/163 |
| 2004/0145973 | A1* | 7/2004 | Nagashima ............... G06F 1/14 368/107 |
| 2004/0210933 | A1* | 10/2004 | Dresti .................... G08C 17/00 725/40 |
| 2006/0250353 | A1* | 11/2006 | Yasutake ............... G06F 3/0338 345/156 |
| 2008/0019082 | A1* | 1/2008 | Krieger ............... B60R 11/0241 361/601 |
| 2010/0246119 | A1 | 9/2010 | Collopy et al. |

(Continued)

*Primary Examiner* — Dinh P Nguyen

(74) *Attorney, Agent, or Firm* — Jefferson IP Law, LLP

(57) ABSTRACT

Exemplary embodiments may disclose a mobile device which is connected with an external input device, and includes a first connector for receiving an input signal generated by the external input device through a docking station, the first connector being detachably connected with the docking station; and a first controller for receiving the input signal from the first connector, and executing a pre-stored function corresponding to the received input signal.

18 Claims, 18 Drawing Sheets

(56) References Cited

U.S. PATENT DOCUMENTS

| | | | |
|---|---|---|---|
| 2011/0098087 A1* | 4/2011 | Tseng | G01C 21/265 455/557 |
| 2011/0115711 A1* | 5/2011 | Gunawan | G06F 1/1626 345/169 |
| 2012/0005691 A1* | 1/2012 | Wong | G06F 9/541 719/319 |
| 2012/0100815 A1 | 4/2012 | Duval | |

* cited by examiner

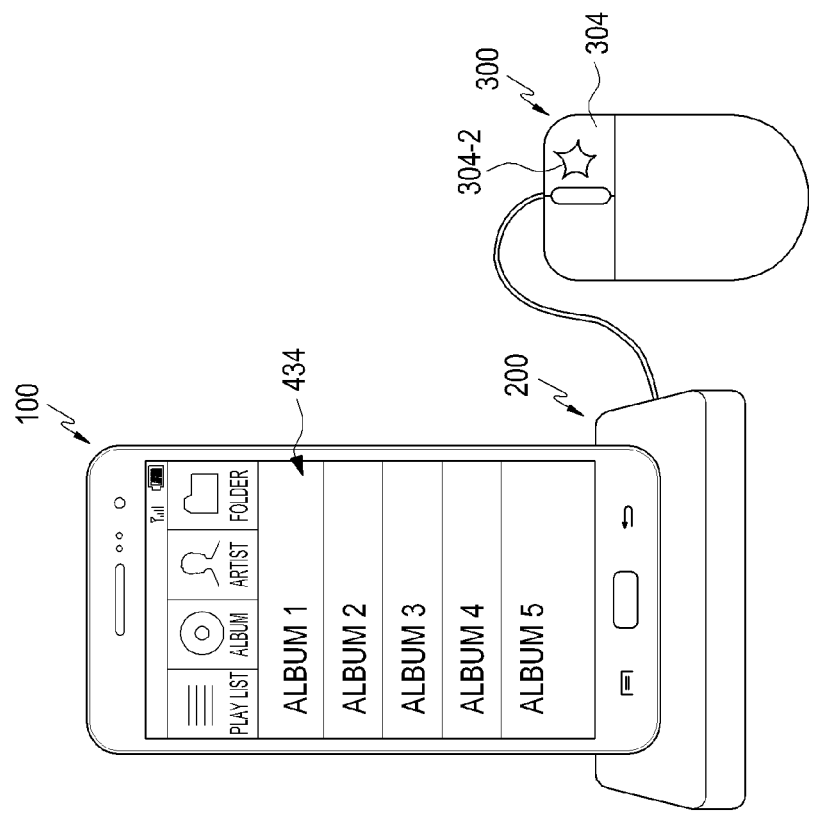
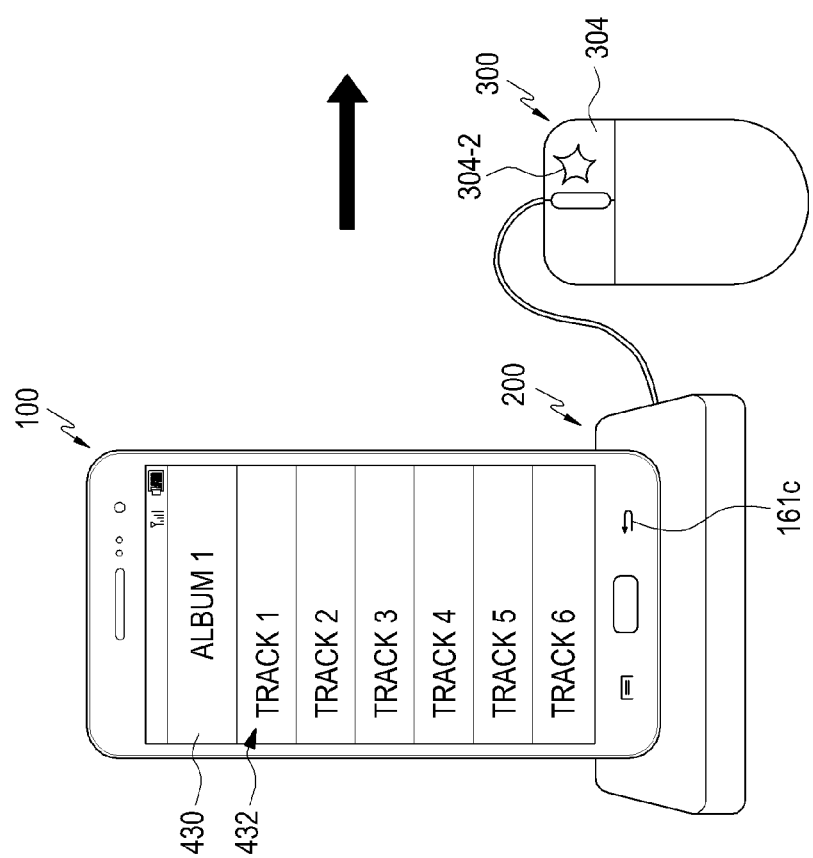
FIG.7B
FIG.7A

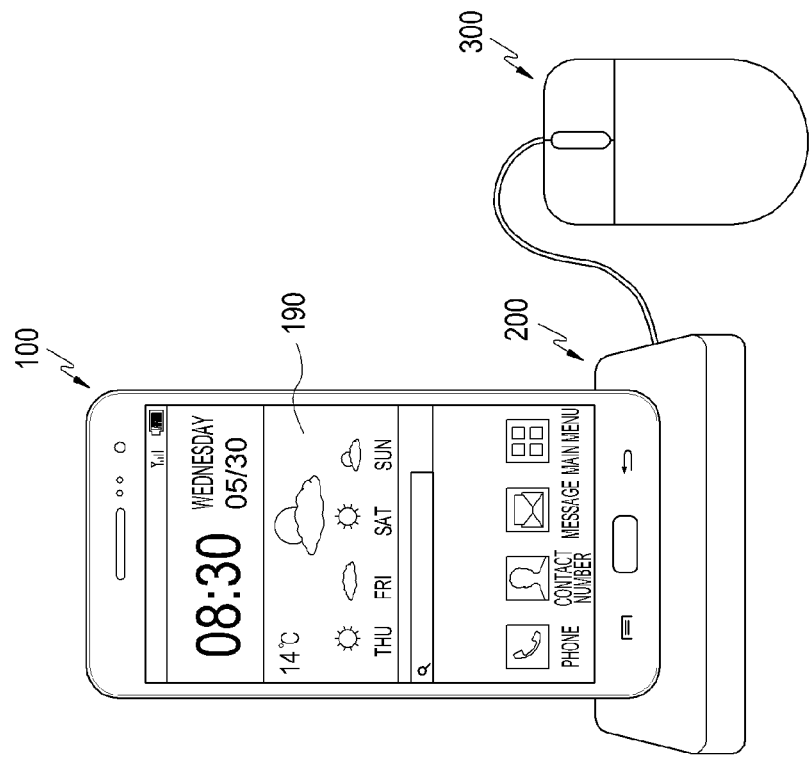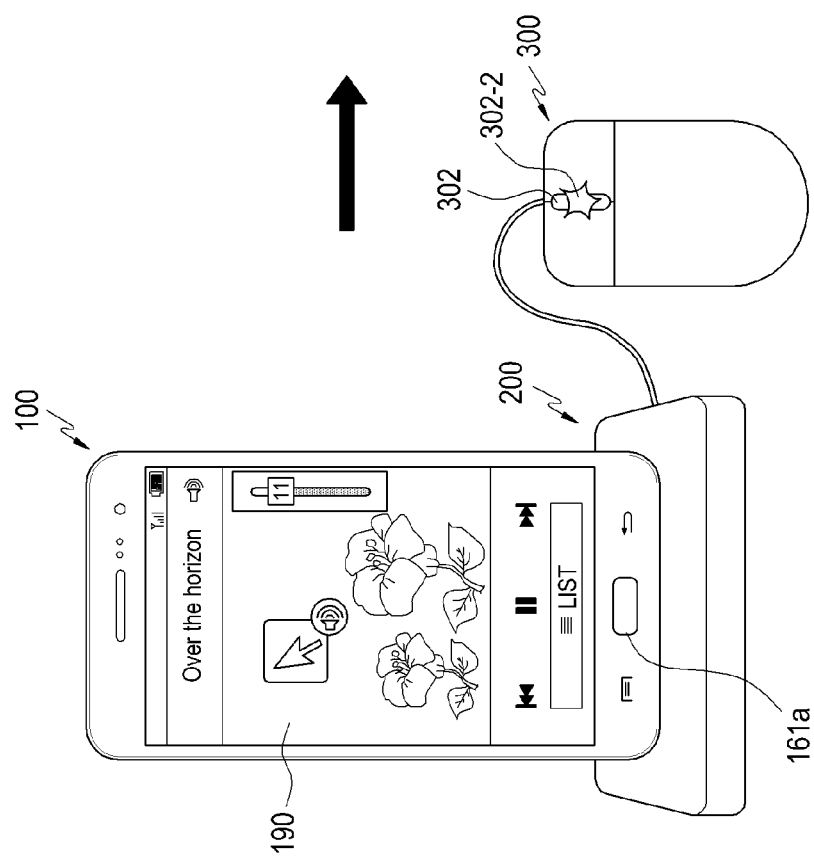

MOBILE DEVICE CONNECTED WITH EXTERNAL INPUT DEVICE AND CONTROL METHOD THEREOF

CROSS-REFERENCE TO RELATED APPLICATION

This application claims priority from Korean Application No. 10-2012-0092194, which was filed in the Korean Intellectual Property Office on Aug. 23, 2012, the entire contents of the disclosure is hereby incorporated by reference.

BACKGROUND

1. Field

Exemplary embodiments relate to a mobile device which is connected with an external input device, and a control method thereof. More particularly, exemplary embodiments relate to a method of controlling a mobile device by using an external input device which is connected with a docking station.

2. Description of the Related Art

Mobile devices of the related art can be connected with a docking station. The docking station of the related art may be connected with the mobile device to perform various functions. In other words, the docking station of the related art may perform, for example, a function of reproducing a sound signal reproduced in the mobile device.

Further, the docking station of the related art, which is connected with the mobile device, may function as an input device. Even though the mobile device of the related art may have a touch screen, the mobile device is smaller than other electronic devices due to its portability. Therefore, input through the touch screen of the related art mobile device may be very difficult. Accordingly, the docking station of the related art has an advantage of providing the input device to resolve inconvenience of the touch input. However, there are also times when the docking station of the related art is connected to the mobile device, and the user may feel it necessary to touch the screen of the mobile device, or press a button on the mobile device. In this case, it may be difficult to touch the touch screen of the related art mobile device, or physically press the button of the mobile button because the docking station of the related art is attached to the mobile device. Accordingly, when the docking station of the related art performs the function of the input device, an inconvenience occurs when the user desires to touch the screen of the mobile device, or press the button of the mobile device. Therefore, a method of providing an effect of performing a touch function or pressing the button, by directly controlling the mobile device, is needed by the mobile device connected to the docking station.

SUMMARY

Exemplary embodiments may provide a method of receiving an input signal from an external device through a docking station which is connected to a mobile device, and controlling the mobile device.

An aspect of an exemplary embodiment may provide a mobile device for connecting with an external input device. The mobile device comprises a first connector for receiving an input signal generated by the external input device through a docking station, the first connector being detachably connected with the docking station; and a first controller for receiving the input signal from the first connector and executing a pre-stored function corresponding to the received input signal.

The external input device may comprise at least one of a mouse device and a keyboard.

The docking station may include a second connector which is connected with the first connector of the mobile device; a third connector which is connected with the external input device; and a second controller for receiving an input signal through the third connector from the external input device and transmitting the received input signal to the mobile device through the second connector.

The pre-stored function may include comprises at least one function performed by in the mobile device.

The external input device may be a mouse device including at least one of a first button and a second button, and an input signal for performing a home button function of the mobile device is generated when the first button is pressed, and an input signal for performing a back button function of the mobile device is generated when the second button is pressed.

The first button of the mouse device may be a wheel button, and the second button of the mouse device is a side button.

The first controller may move a cursor displayed on a screen of the mobile device corresponding to the input signal, and change the pre-stored function in accordance with an area of the screen where the cursor is located.

The first controller may display a menu window including a menu item corresponding to the pre-stored function on a screen of the mobile device when receiving a pre-stored input signal, and execute the pre-stored function corresponding to the menu item, when detecting a selection of the menu item.

The first controller may display each icon corresponding to at least one function performed in the mobile device on a screen of the mobile device when the first connector is connected with the docking station, and executes the at least one function corresponding to the each icon when the each icon is selected.

The first controller may move a cursor displayed on a screen of the mobile device corresponding to the input signal, displays an icon indicating a button on the screen when the cursor is located near the button included in the mobile device, and execute a function which is equivalent to the button when the icon is selected.

The input signal may allow a cursor displayed on a screen of the mobile device to touch an edge of the screen.

Another aspect of an exemplary embodiment may provide a method for controlling a mobile device which is connected with an external input device. The method comprises receiving an input signal generated by the external input device through a docking station, at a first connector of the mobile device; and executing a pre-stored function, corresponding to the received input signal.

The external input device may comprise at least one of a mouse device and a keyboard.

The docking station may receive an input signal through a third connector from the external input device and transmits the received input signal to the mobile device through a second connector which is connected with the first connector of the mobile device.

The pre-stored function may comprise at least one function performed in the mobile device.

The external input device may be a mouse device including at least one of a first button and a second button, and an input signal for performing a home button function of the mobile device may be generated when the first button is pressed, and an input signal for performing a back button function of the mobile device is generated when the second button is pressed.

The method first button of the mouse device may be a wheel button, and the second button of the mouse device may be a side button.

The method may further comprise moving a cursor displayed on a screen of the mobile device corresponding to the input signal, and the pre-stored function is changed in accordance with an area of the screen where the cursor is located.

The method may further include displaying a menu window including a menu item corresponding to the pre-stored function on a screen of the mobile device when a pre-stored input signal is received; and executing the pre-stored function corresponding to the menu item when a selection of the menu item is detected.

The method may further comprise detecting a connection between the first connector and the docking station; displaying each icon corresponding to at least one function performed in the mobile device on a screen of the mobile device when the connection between the first connector and the docking station is detected; and executing the at least one function corresponding to the each icon when the each icon is selected.

The method may further comprise moving a cursor displayed on a screen of the mobile device corresponding to the input signal; displaying an icon indicating a button on the screen when the cursor is located near the button included in the mobile device; and executing a function which is equivalent to the button when the icon is selected.

The input signal may allow a cursor displayed on a screen of the mobile device to touch an edge of the screen.

Another aspect of an exemplary embodiment may provide a docking station which is connected with an external device. The docking station comprises a first connector for connecting with to the external device for receiving an input signal generated by the external device; a second connector for connecting with a mobile device for transmitting the received input signal to the mobile device; and a controller for transmitting the received input signal to the mobile device through the first connector and the second connector.

According to a mobile device connected to an external input device corresponding to an exemplary embodiment, the exemplary embodiments may receive an input signal of an external input device through a docking station, and execute a pre-stored function corresponding to the input signal in the mobile device.

BRIEF DESCRIPTION OF THE DRAWINGS

The above and/or other aspects of the exemplary embodiments will become more apparent by describing in detail exemplary embodiments thereof with references to the attached drawings in which:

FIGS. 7A and 7B illustrates a second example of the mobile device according to the embodiment;

FIGS. 8A and 8B illustrates a third example of the mobile device according to the embodiment;

DETAILED DESCRIPTION OF EXEMPLARY EMBODIMENTS

Exemplary embodiments may have various modifications, and specific embodiments are described with reference to the drawings in detail. However, the embodiments do not limit the exemplary embodiments to a specific implementation, and should be construed as including all modifications, equivalents, and replacements included in the spirit and scope of the exemplary embodiments.

The terms including an ordinal number such as first, second, etc. can be used to describe various elements, but the elements should not be limited by those terms. The terms are used merely for the purpose to distinguish an element from the other elements. For example, a first element may be named to a second element, and similarly, a second element may be named to a first element without departing from the scope of the exemplary embodiments. The term "and/or" includes any and a combination of a plurality of the associated listed items.

It should be noted that the terms used herein are merely used to describe a specific embodiment, but not to limit the exemplary embodiments. Incidentally, unless clearly used otherwise, expressions in the singular number include a plural meaning. In this application, the term "comprising," "including," etc., intend to express the existence of the characteristic, the numeral, the step, the operation, the element, the part, or the combination thereof, and do not intend to exclude another characteristic, numeral, step, operation, element, part, or any combination thereof, or any addition thereto.

Unless defined otherwise, the terms used herein including technological or scientific terms have the same meaning that is generally understood by those ordinarily skilled in the art to which the exemplary embodiments pertain. The terms used herein shall not be interpreted not only based on the definition of any dictionary, but also the meaning that is used in the field to which the exemplary embodiments pertain. Also, unless clearly defined, the terms used herein shall not be interpreted too ideally or formally.

Figure 1:
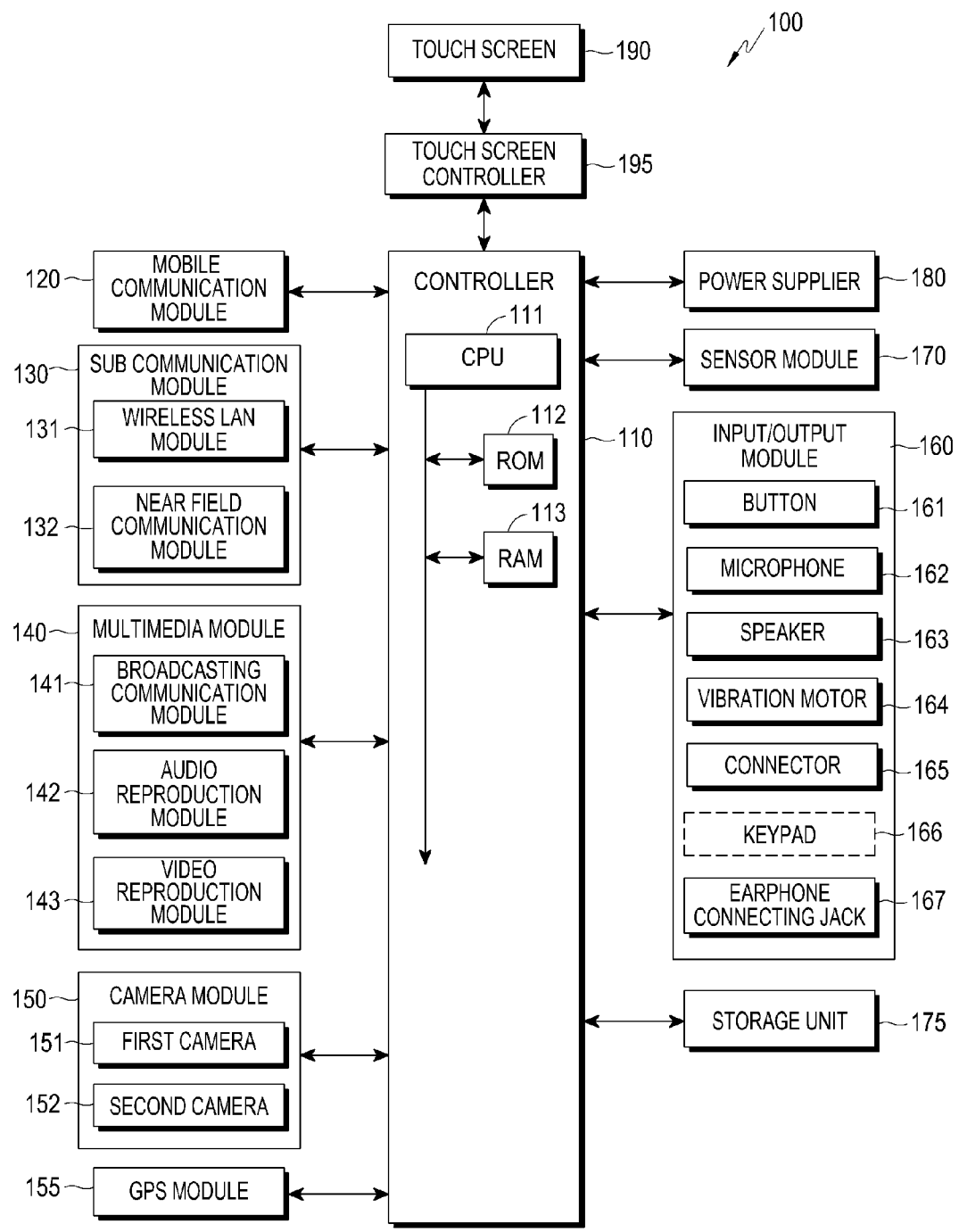
FIG. 1 is a block diagram schematically illustrating a mobile device according to an embodiment.

FIG. 1 is a block diagram schematically illustrating a mobile device according to an embodiment.

Referring to FIG. 1, a device 100 may be connected with an external device (not shown) by using a sub communication module 130, a connector 165, and an external device connector, such as an earphone connecting jack 167. The "external device" may include various devices such as an earphone, an external speaker, a Universal Serial Bus (USB) memory, a charger, a cradle, a docking station, a Digital Multimedia Broadcasting (DMB) antenna, a mobile payment related-device, a health management device (blood sugar tester), a game machine, an automobile navigation device, etc., which can be connected to the device 100 through a wire by being attached to/detached from the device 100. Further, the "external device" may include a Bluetooth communication device, a short distance communication device such as a Near Field Communication (NFC) device, a WiFi Direct communication device, and a wireless Access Point (AP), which can be wirelessly connected to the device 100 through a short distance communication. In addition, the external device may include another device, a mobile phone, a smart phone, a tablet PC, a desktop PC, and/or a server.

Referring to FIG. 1, the device 100 includes a touch screen 190 and a touch screen controller 195. Further, the device 100 includes a controller 110, a mobile communication module 120, a sub communication module 130, a multimedia module 140, a camera module 150, a GPS module 155, an input/output module 160, a sensor module 170, a storage unit 175, and a power supplier 180. The sub communication module 130 includes at least one of a wireless LAN module 131 and a near field communication module 132, and the multimedia module 140 includes at least one of a broadcasting communication module 141, an audio reproduction module 142, and a video reproduction module 143. The camera module 150 includes at least one of a first camera 151 and a second camera 152. The input/output module 160 includes at least one of a button 161, a microphone 162, a speaker 163, a vibration motor 164, the connector 165, a keypad 166, and the earphone connecting jack 167. Further, although FIG. 1 shows an example of a touch screen 190 and a touch screen controller 195, the exemplary embodiments are not limited. In other words, any display unit may be substituted for the touch screen 190, and any display controller may be substituted for the touch screen controller 195. Further, the device 100 may comprise a mobile device.

The controller 110 may include a CPU 111, a ROM 112 storing a control program for controlling the device 100, and a RAM 113 used as a storage area for storing a signal or data input from the outside of the device 100 or for work performed in the device 100. The CPU 111 may include a single core, a dual core, a triple core, or a quad core. The CPU 111, the ROM 112, and the RAM 113 can be mutually connected to each other through an internal bus.

The controller 110 may control the mobile communication module 120, the sub communication module 130, the multimedia module 140, the camera module 150, the GPS module 155, the input/output module 160, the sensor module 170, the storage unit 175, the power supplier 180, the touch screen 190, and the touch screen controller 195.

The mobile communication module 120 enables the device 100 to be connected with the external device through mobile communication by using at least one antenna or a plurality of antennas, according to a control of the controller 110. The mobile communication module 120 transmits/receives a wireless signal for voice phone communication, video phone communication, a Short Message Service (SMS), or a Multimedia Message Service (MMS) with a mobile phone (not shown), a smart phone (not shown), a tablet PC, or another device (not shown) having a phone number input into the device 100.

The sub communication module 130 may include at least one of the wireless LAN module 131 and the near field communication module 132. For example, the sub communication module 130 may include only the wireless LAN module 131, only the near field communication module 132, or both the wireless LAN module 131 and the near field communication module 132.

The wireless LAN module 131 can be Internet-connected according to a control of the controller 110 in a place where a wireless Access Point (AP) (not shown) is installed. The wireless LAN module 131 supports a wireless LAN standard of Institute of Electrical and Electronics Engineers (IEEE 802.11x). The near field communication module 132 can wirelessly perform near field communication between the device 100 and an image forming apparatus (not shown) according to a control of the controller 110. A near field communication scheme may include Bluetooth, Infrared Data Association (IrDA) communication, WiFi-Direct communication, Near Field Communication (NFC), etc.

The device 100 may include at least one of the mobile communication module 120, the wireless LAN module 131, and the near field communication module 132, according to its capability. For example, the device 100 may include a combination of the mobile communication module 120, the wireless LAN module 131, and the near field communication module 132, according to its capability.

The multimedia module 140 may include the broadcasting communication module 141, the audio reproduction module 142, or the video reproduction module 143. The broadcasting communication module 141 can receive a broadcasting signal (for example, a TV broadcasting signal, a radio broadcasting signal, or a data broadcasting signal) and broadcasting supplement information (for example, Electric Program Guide (EPG) or Electric Service Guide (ESG)) output from a broadcasting station through a broadcasting communication antenna (not shown) according to a control of the controller 110. The audio reproduction module 142 can reproduce a digital audio file (for example, a file having a file extension of mp3, wma, ogg, or wav) stored or received according to a control of the controller 110. The video reproduction module 143 can reproduce a digital video file (for example, a file having a file extension of mpeg, mpg, mp4, avi, mov, or mkv) stored or received according to a control of the controller 110. The video reproduction module 143 can reproduce the digital audio file.

The multimedia module 140 may include the audio reproduction module 142 and the video reproduction module 143, but not the broadcasting communication module 141. Further, the audio reproduction module 142 or the video reproduction module 143 of the multimedia module 140 may be included in the controller 110.

The camera module 150 may include at least one of the first camera 151 and the second camera 152 for photographing a still image or a video, according to a control of the controller 110. Further the first camera 151 or the second camera 152 may include an auxiliary light source (for example, a flash (not shown)) for providing a light amount required for the photograph. The first camera 151 may be disposed on a front surface of the device 100, and the second camera 152 may be disposed on a back surface of the device 100. In a different scheme, the first camera 151 and the second camera 152 are disposed adjacently to each other (for example, an interval between the first camera 151 and the second camera 152 is larger than 1 cm and smaller than 8 cm) to photograph a three dimensional still image or a three dimensional video.

The GPS module 155 can receive radio waves from a plurality of GPS satellites (not shown) on the earth's orbit, and calculate a position of the device 100 by using a time of arrival to the device 100 from the GPS satellite (not shown).

The input/output module 160 may include at least one of a plurality of buttons 161, the microphone 162, the speaker 163, the vibration motor 164, the connector 165, and/or the keypad 166.

The button 161 may be formed on a front surface, a side surface, or a back surface of a housing of the device 100, and may include at least one of a power/lock button (not shown), a volume button (not shown), a menu button, a home button, a back button, and a search button.

The microphone 162 receives a voice or a sound to generate an electrical signal according to a control of the controller 110.

The speaker 163 can output sounds corresponding to various signals (for example, a wireless signal, a broadcasting signal, a digital audio file, a digital video file, taking a picture or the like) of the mobile communication module 120, the sub communication module 130, the multimedia module 140, or the camera module 150 to the outside of the device 100 according to a control of the controller 110. The speaker 163 can output a sound (for example, button tone or ringing tone) corresponding to a function performed by the device 100. One speaker 163 or a plurality of speakers 163 may be formed on a suitable position or positions of the housing of the device 100.

The vibration motor 164 can convert an electrical signal to a mechanical vibration according to a control of the controller 110. For example, when the device 100 in a vibration mode receives voice phone communication from another device (not shown), the vibration motor 164 is operated. One vibration motor 164 or a plurality of motors 164 may be formed within the housing of the device 100. The vibration motor 164 can operate in response to a touch action of a user who touches the touch screen 190, and successive touch actions on the touch screen 190.

The connector 165 may be used as an interface for connecting the device 100 and an external device (not shown), the device 100, and a power source (not shown). Data stored in the storage unit 175 of the device 100 may be transmitted to the external device (not shown) or the data may be received from the external device (not shown) through a wired cable connected to the connector 165 according to a control of the controller 110. At this time, the external device may be a docking station, and the data may an input signal transmitted from the external input device, for example, a mouse, a keyboard, etc. Further, the device 100 may receive power from a power source (not shown) through the wired cable connected to the connector 165, or a charged battery (not shown).

The keypad 166 can receive a key input from the user for the control of the device 100. The keypad 166 includes a physical keypad (not shown) formed in the device 100, or a virtual keypad (not shown) displayed on the touch screen 190. The physical keypad (not shown) formed in the device 100 may be excluded, according to a capability or a structure of the device 100.

An earphone (not shown) is inserted into the earphone connecting jack 167 so that the earphone connecting jack 167 can be connected with the device 100.

The sensor module 170 includes at least one sensor for detecting a state of the device 100. For example, the sensor module 170 may include a proximity sensor for detecting whether the user approaches the device 100, a luminance sensor (not shown) for detecting an amount of ambient light of the device 100, or a motion sensor (not shown) for detecting the operation of the device 100 (for example, a rotation of the device 100, and an acceleration or vibration applied to the device 100), a geo-magnetic sensor (not shown) for detecting a point of the compass by using an earth's magnetic field, a gravity sensor (not shown) for detecting a gravity action direction, and an altimeter (not shown) for measuring an atmospheric pressure to detect an altitude. At least one sensor can detect the state of the device 100, generate a signal corresponding to the detection, and transmit the generated signal to the controller 110. The sensor of the sensor module 170 may be added or omitted according to the capability of the device 100.

The storage unit 175 can store a signal or data input/output according to operations of the mobile communication module 120, the sub communication module 130, the multimedia module 140, the camera module 150, the GPS module 155, the input/output module 160, the sensor module 170, and the touch screen 190 according to a control of the controller 110. The storage unit 175 can store a control program and applications for controlling the device 100 or the controller 110.

The term "storage unit" includes the storage unit 175, the ROM 112 and the RAM 113 within the controller 110, or a memory card (not shown) (for example, an SD card and a memory stick) installed in the device 100. The storage unit may include a nonvolatile memory, a volatile memory, a Hard Disk Drive (HDD), or a Solid State Drive (SSD).

The power supplier 180 can supply power to one battery or a plurality of batteries (not shown) provided at the housing of the device 100, according to a control of the controller 110. The one battery or the plurality of batteries (not shown) supply power to the device 100. Further, the power supplier 180 can supply power input from an external power source (not shown) to the device 100 through a wired cable connected to the connector 165. In addition, the power supplier 180 can supply power wirelessly input from the external power source through a wireless charging technology to the device 100.

The touch screen 190 can provide the user with a user interface corresponding to various services (for example, phone communication, data transmission, broadcasting, taking a picture). The touch screen 190 can transmit an analog signal corresponding to at least one touch input to the user interface to the touch screen controller 195. The touch screen 190 can receive at least one touch through a body of the user (for example, fingers, including a thumb) or a touchable input means (for example, a stylus pen). Further, the touch screen 190 can receive successive actions of one touch among the at least one touch. The touch screen 190 can transmit the analog signal corresponding to successive actions of the input touch to the touch screen controller 195.

The touch used in the exemplary embodiments is not limited to a contact between the touch screen 190 and the body of the user or the touchable input means, and may include a noncontact. A detectable interval of the touch screen 190 may be changed according to the capability or structure of the device 100.

The touch screen 190 may be implemented, for example, in a resistive type, a capacitive type, an infrared type, or an acoustic wave type.

The touch screen controller 195 converts the analog signal received from the touch screen 190 to a digital signal (for example, X and Y coordinates), and then transmits the digital signal to the controller 110. The controller 110 can control the touch screen 190 by using the digital signal received from the touch screen controller 195. For example, the controller 110 can enable a shortcut icon (not shown) displayed on the touch screen 190 to be selected or executed in response to the touch. Further, the touch screen controller 195 may be included in the controller 110.

Figure 2:
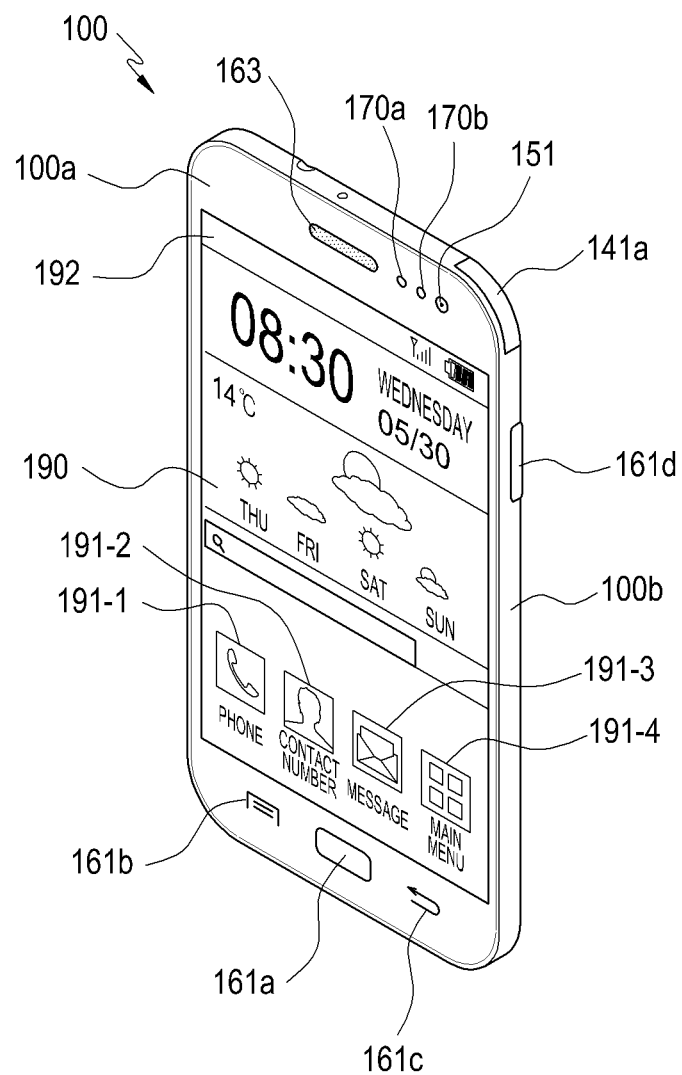
FIG. 2 is a front perspective view of the mobile device according to the embodiment.
Figure 3:
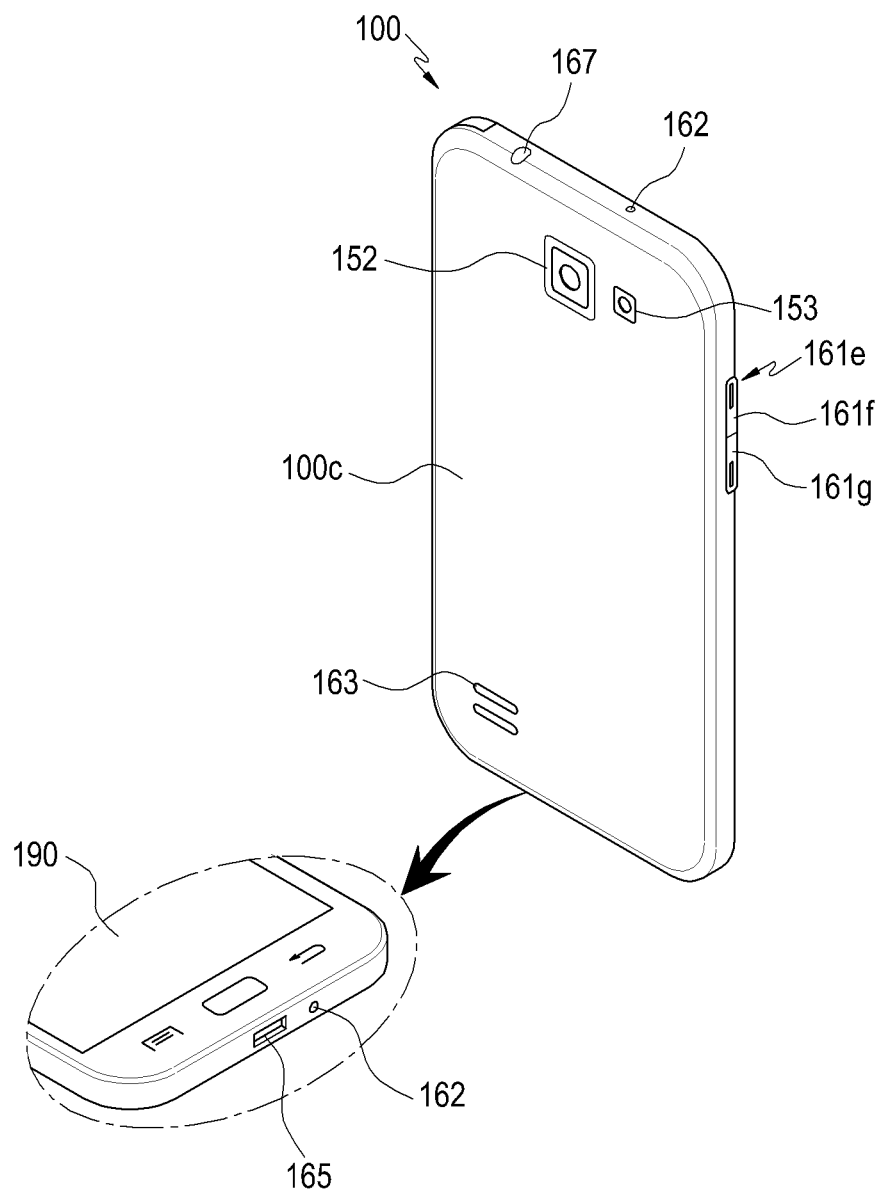
FIG. 3 is a rear perspective view of the mobile device according to the embodiment.

FIG. 2 is a front perspective view of the mobile device according to an embodiment. FIG. 3 is a rear perspective view of the mobile device according to an embodiment.

Referring to FIG. 2, the touch screen 190 is disposed in the center of a front surface 100a of the device 100. The touch screen 190 is formed to occupy most of the front surface 100a of the device 100. FIG. 2 shows an example where a main home screen is displayed on the touch screen 190. The main home screen is the first screen displayed on the touch screen 190 when the device 100 is turned on. Further, when the device 100 has different home screens of several pages, the main home screen may be the first home screen, among the several pages of home screens. Shortcut icons 191-1, 191-2, and 191-3 for executing frequently used applications, a main menu switching key 191-4, time, weather, etc., may be displayed on the home screen. The main menu switching key 191-4 displays a menu screen on the touch screen 190. Further, a status bar 192 which displays the status of the device 100 such as a battery charging status, a received signal intensity, and a current time may be formed on an upper end of the touch screen 190.

A home button 161a, a menu button 161b, and a back button 161c may be formed on a lower end of the touch screen 190.

The home button 161a displays the main home screen on the touch screen 190. For example, when the home button 161a is pressed (or touched) in a state where a home screen different from the main home screen or the menu screen is displayed on the touch screen 190, the main home screen may be displayed on the touch screen 190. Further, when the home button 161a is pressed (or touched) while applications are executed on the touch screen 190, the main home screen shown in FIG. 2 may be displayed on the touch screen 190. In addition, the home button 161a may be used to display recently used applications or a task manager on the touch screen 190.

The menu button 161b provides a connection menu which can be used on the touch screen 190. The connection menu may include a widget addition menu, a background changing menu, a search menu, an editing menu, an environment setting menu, etc. Further, the connection menu connected to an application may be provided, when the application is executed.

The back button 161c may display the screen which was executed just before the currently executed screen, or terminate the most recently used application.

The first camera 151, the luminance sensor 170a, and the proximity sensor 170b may be disposed on edges of the front surface 100a of the device 100. The second camera 152, a flash 153, and the speaker 163 may be disposed on a rear surface 100c of the device 100.

For example, a power/reset button 161d, a volume control button 161e, a terrestrial DMB antenna 141a for broadcasting reception, and one or a plurality of microphones 162 may be displayed on a side surface 100b of the device 100.

The DMB antenna 141a may be fixed to the device 100 or may formed to be attachable to/detachable from the device 100.

Further, the connector 165 is formed on a lower side surface of the device 100. A plurality of electrodes are formed in the connector 165, and may be connected to the external device through a wire. The earphone jack 167 may be formed on an upper side surface of the device. Earphones may be inserted into the earphone jack 167.

Figure 4:
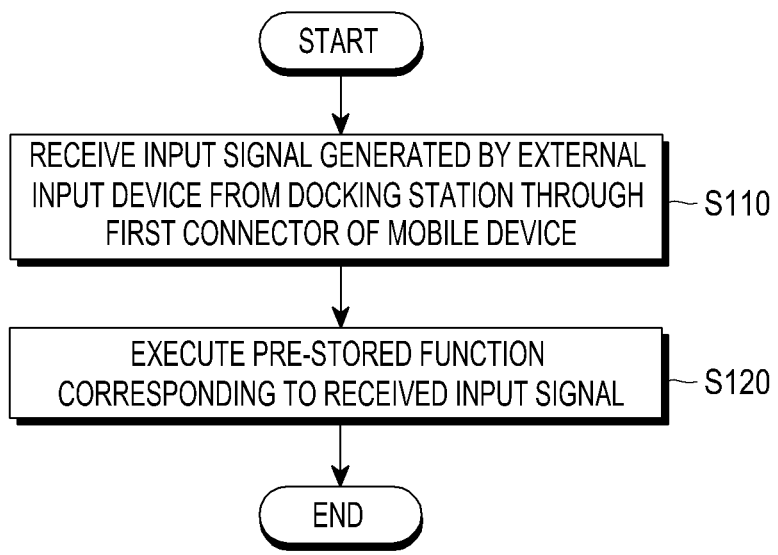
FIG. 4 is a flowchart illustrating a method of controlling the mobile device according to the embodiment.
Figure 5:
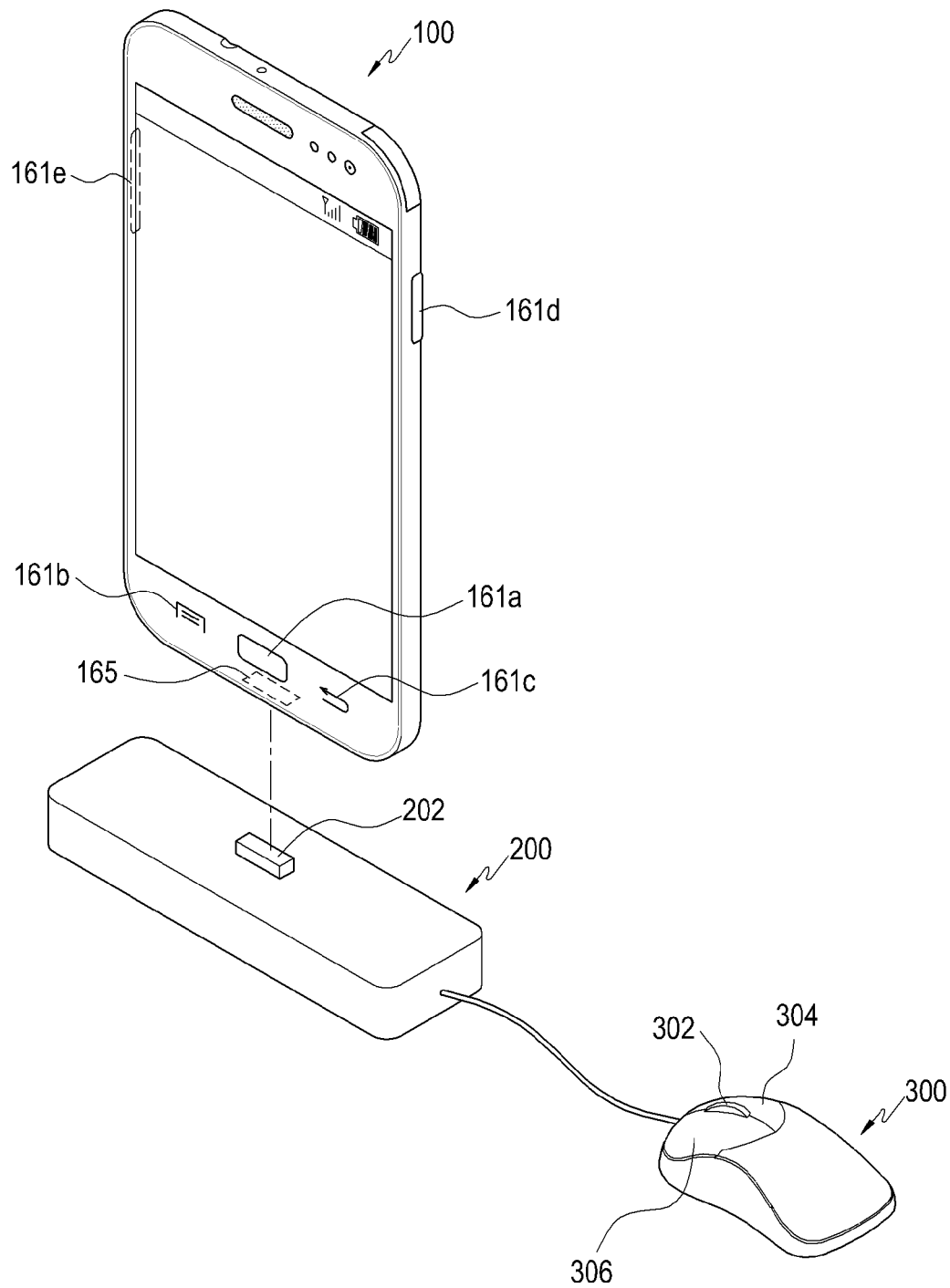
FIG. 5 is a diagram schematically illustrating the mobile device according to the embodiment.

FIG. 4 is a flowchart illustrating a method of controlling the mobile device according to an embodiment. FIG. 5 is a diagram schematically illustrating the mobile device according to an embodiment.

Referring to FIG. 4, according to the method of controlling the mobile device according to an embodiment, an input signal generated by the external input device is received through the first connector of the mobile device from the dock station in step S110. Referring to FIG. 5, the device 100 is detachably connected with a docking station 200. The device 100 includes the first connector 165 for receiving the input signal generated in an external input device 300 from the docking station 200, and the first controller 110 for receiving the input signal from the first connector 165 and executing a pre-stored function corresponding to the received input signal. Further, the docking station 200 may include a second connector 202 connected with the first connector 165 of the mobile device, a third connector connected with the external input device 300, and a second controller for transmitting the input signal received through the third connector from the external input device to the mobile device through the second connector 202. At this time, the docking station 200 is detachably connected with the device 100. In other words, since the first connector 165 and the second connector 202 are detachably connected with each other, the docking station 200 and the device 100 can be attached or detached from each other. The first controller 110 of the mobile device receives the input signal from the docking station 200. At this time, the input signal is received from the docking station 200 through the first connector 165, and the first connector 165 may be connected with the second connector 202 included in the docking station 200. The input signal is generated by the external input device 300. At this time, the external input device 300 may comprise, for example, at least one of a mouse and a keyboard. Further, the input signal may correspond to, for example, one of motions of clicking a right button 304 of the mouse, clicking a left button 306 of the mouse, scrolling a wheel 302, clicking the wheel 302, and a movement. In addition, the input signal may be, for example, at least one key input of the keyboard. As described above, the input signal generated by the external input device 300 may be transmitted to the docking station 200 through the third connector of the docking station 200 connected with the external input device 300. Further, the second controller of the docking station 200 can transmit the input signal received from the external input device 300 through the third connector to the device 100 through the second connector 202. Accordingly, the device 100 can receive the input signal generated by the external input device 300 through the docking station 200. For example, the device 100 can receive the input signal, which is the right click generated by the external input device 300, corresponding to the mouse through the docking station 200. Further, for example, the external input device 300 may be the mouse device 300, including a first button and a second button. In addition, the first button may be the wheel button 302, and the second button of the mouse device may be the side button 304 or 306. Accordingly, the device 100 can receive the input signal generated by pressing the wheel button 302 of the mouse device 300, and the input signal generated by pressing the side button 304 or 306 through the docking station 200.

Thereafter, the pre-stored function corresponding to the received input signal is executed in step S120. The first controller 110 of the device 100 can execute the pre-stored function corresponding to the input signal generated by the external input device 300, which is received through the docking station 200. Further, the pre-stored function may include, for example, one or more of the same functions as functions performed by buttons 161a, 161b, 161c, 161d, and 161e included in the mobile device. Further, the pre-stored function may comprise at least one of various functions capable of performing in the mobile device besides the functions performed by the buttons 161a, 161b, 161c, 161d and 161e included in the mobile device. In other words, the pre-stored function may be executed in the mobile device, in accordance with the input signal, or may include one or more of the same functions as the functions performed by the button 161 of the mobile device. For example, the external input device 300 may be the mouse device 300 including the first button and the second button. Further, the first button may be the wheel button 302, and the second button of the mouse device may be the side button 304 or 306. Accordingly, the device 100 can receive a first input signal generated by pressing the wheel button 302 of the mouse device 300, and a second input signal generated by pressing the side button 304 or 306 through the docking station 200. At this time, the pre-stored function corresponding to the first input signal may be the same function as that performed by the home button 161a, and the pre-stored function corresponding to the second input signal may be the same function as that performed by the back button 161c. The function performed by the home button 161a displays the main home screen on the touch screen 190. For example, when the home button 161a is pressed in a state where the home screen is different from the main home screen, or the menu screen is displayed, the main home screen may be displayed on the touch screen 190. Further, when the home button 161a is pressed while applications are executed on the touch screen 190, the main home screen shown in FIG. 2 may be displayed on the touch screen 190. In addition, the home button 161a may be used to display recently used applications or a task manager on the touch screen 190. The function performed by the back button 161c displays the screen which was displayed just before the currently displayed screen, or terminates the most recently used application. Further, the pre-stored function may be a function for controlling a cursor displayed on the touch screen 190 of the mobile device. In other words, the cursor displayed on the touch screen 190 of the mobile device may be controlled by the input signal generated by the external input device 300, and then moved on the touch screen 190. As described above, it is apparent to those skilled in the art that the pre-stored function, which can be executed in the device 100, may have various types. According to the mobile device corresponding to an embodiment, the input signal of the external input device may be received, and then the pre-stored function corresponding to the input signal can be executed in the mobile device.

Figure 6:
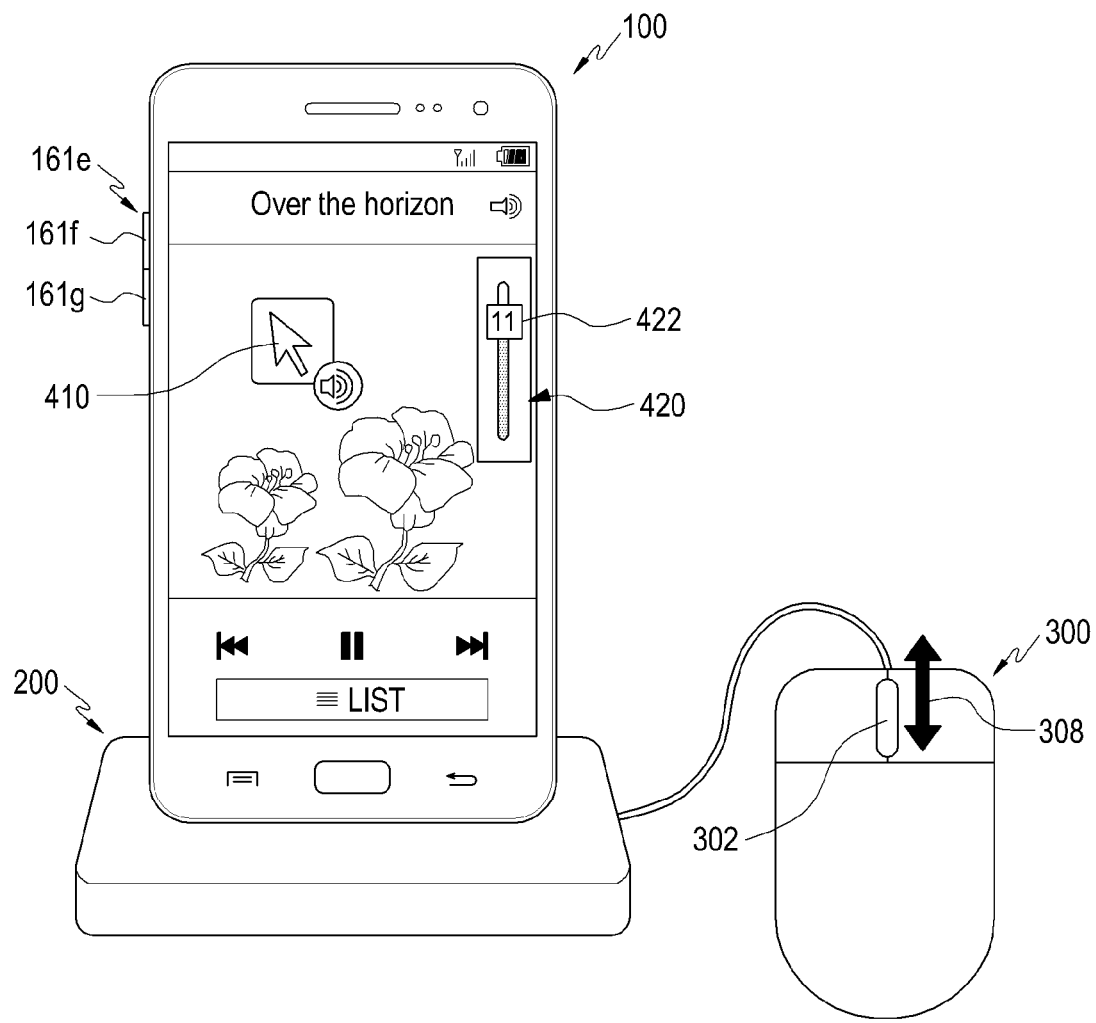
FIG. 6 illustrates a first example of a mobile device according to the embodiment.

FIG. 6 illustrates a first example of the mobile device.

Referring to FIG. 6, the device 100 may be detachably connected with the docking station 200. Further, the docking station 200 can transmit the input signal generated by the external input device 300 through the second connector connected with the first connector of the mobile device. At this time, as illustrated in FIG. 6, for example, the external input device 300 may be the mouse, and the input signal may be a wheel scrolling 308 generated by the mouse 300. Accordingly, the device 100 can receive the wheel scrolling 308, corresponding to the input signal generated by the mouse 300, through the docking station 200.

Further, the first controller 110 of the device 100 can execute the pre-stored function, corresponding to the input signal received through the first connector. For example, as illustrated in FIG. 6, the input signal may be the wheel scroll 308, and the first controller 110 can execute the pre-stored function corresponding to the wheel scrolling 308. At this time, the pre-stored function may include at least one of the same functions as those performed by the button included in the mobile device. For example, as illustrated in FIG. 6, the pre-stored function may be the same function as that of the volume control button 161e. Further, the pre-stored function may comprise at least one of various functions capable of performing in the mobile device besides the function performed by the volume control button 161e included in the mobile device. Accordingly, the first controller 110 can control a volume of the device 100 according to the wheel scrolling 308. For example, when the first controller 110 receives the up wheel scrolling, the first controller 110 can perform the same function of increasing the volume of the device 100, as that performed by a volume increase button 161f of the volume control button. When the first controller 110 receives the down wheel scrolling, the first controller 110 can perform the same function of decreasing the volume of the device 100, as that performed by a volume decrease button 161g of the button control button. The device 100 can display a volume control bar 420 showing the increase or decrease of the volume when the function of increasing or decreasing the volume is performed. Further, the first controller 110 can increase or decrease a volume level indication 422 included in the volume control bar, according to the increase or decrease of the wheel scroll. In addition, the input signal may be a movement of the mouse 300. The pre-stored function may be a movement of a cursor 410 displayed on the touch screen 190 of the mobile device. Accordingly, the first controller 110 can receive the input signal corresponding to the movement of the mouse through the docking station 200, and move the cursor 410 in accordance with the input signal.

FIGS. 7A and 7B illustrate a second example of the mobile device.

Referring to FIGS. 7A and 7B, the device 100 can be detachably connected with the docking station 200. Further, the docking station 200 can transmit the input signal generated by the external input device 300 through the second connector connected with the first connector of the mobile device. At this time, for example, the external input device 300 may be the mouse and the input signal may be a right click 304-2 generated by the mouse 300, as illustrated in FIGS. 7A and 7B. Accordingly, the device 100 can receive the right click 304-2, corresponding to the input signal generated by the mouse 300 through the docking station 200.

Further, the first controller 110 of the device 100 can execute the pre-stored function, corresponding to the input signal received through the first connector. For example, as illustrated in FIGS. 7A and 7B, the input signal may be the right click 304-2, and the first controller 110 can execute the pre-stored function corresponding to the right click 304-2. At this time, the pre-stored function may include one or more of the same functions as those performed by the button included in the mobile device. For example, as illustrated in FIGS. 7A and 7B, the pre-stored function may be the same function as that performed by the back button 161*c*. Further, the pre-stored function may comprise at least one of various functions capable of performing in the mobile device besides the function performed by the button 161*c* included in the mobile device. Accordingly, the first controller 110 can execute the back button 161*c* according to the right click 304-2. For example, a music application is executed in FIG. 7A. In other words, according to the execution of the music application, a screen showing lists of track #1 to track #5 432 in album #1 430 is displayed. At this time, the input signal corresponding to the right click 304-2 generated by the mouse, which is the external input device 300, can be transmitted to the device 100 through docking station 200. Further, the first controller 110 of the mobile device can execute the pre-stored function corresponding to the right click 304-2. The pre-stored function may be the same function as that performed by the back button 161*c*. Accordingly, the first controller 110 can execute the back button 161*c* corresponding to the right click 304-2. FIG. 7B shows the touch screen 190 when the back button 161*c* is executed. Referring to FIG. 7B, the back button may be executed in the screen of FIG. 7A showing the tracks included in the album of the music application, and the screen is switched to a screen where an album list 434 is displayed.

FIGS. 8A and 8B illustrate a third example of the mobile device.

Referring to FIGS. 8A and 8B, the device 100 can be detachably connected with the docking station 200. Further, the docking station 200 can transmit the input signal generated by the external input device 300 through the second connector connected with the first connector of the mobile device. For example, as illustrated in FIGS. 8A and 8B, the external input device 300 may be the mouse, and the input signal may be a wheel click 302-2 generated by the mouse 300. Accordingly, the device 100 can receive the wheel click 302-2, corresponding to the input signal generated by the mouse 300, through the docking station 200.

Further, the first controller 110 of the device 100 can execute the pre-stored function, corresponding to the input signal received through the first connector. For example, as illustrated in FIGS. 8A and 8B, the input signal may the wheel click 302-2, and the first controller 110 can execute the pre-stored function corresponding to the wheel click 302-2. At this time, the pre-stored function may include one or more of the same functions as those performed by the button included in the mobile device. For example, as illustrated in FIG. 8, the pre-stored function may the same function as that of the home button 161*a*. Accordingly, the first controller 110 can execute the home button 161*a* according to the wheel click 302-2. For example, the music application is executed in FIG. 8A. In other words, according to the execution of the music application, a screen is displayed where the music is reproduced. At this time, the input signal, corresponding to the wheel click 302-2 generated by the mouse which is the external input device 300, can be transmitted to the device 100 through the docking station 200. Further, the first controller 110 of the mobile device can execute the pre-stored function, corresponding to the wheel click 302-2. The pre-stored function may the same function as that of the home button 161*a*. Accordingly, the first controller 110 can execute the home button 161*a* corresponding to the wheel click 302-2. FIG. 8B shows the touch screen 190 where the home button 161*a* is executed. Referring to FIG. 8B, the home button may be executed in the screen of FIG. 8A showing the reproduction of the music in the music application, and the screen is switched to a screen showing the home screen.

Figure 9:
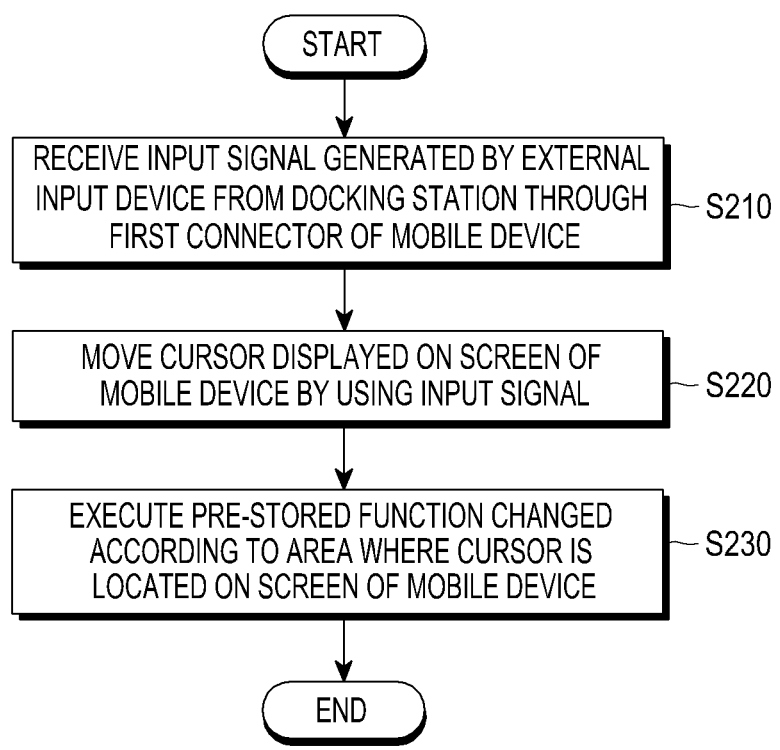
FIG. 9 is a flowchart illustrating a method of controlling a mobile device according to another embodiment.
Figure 10:
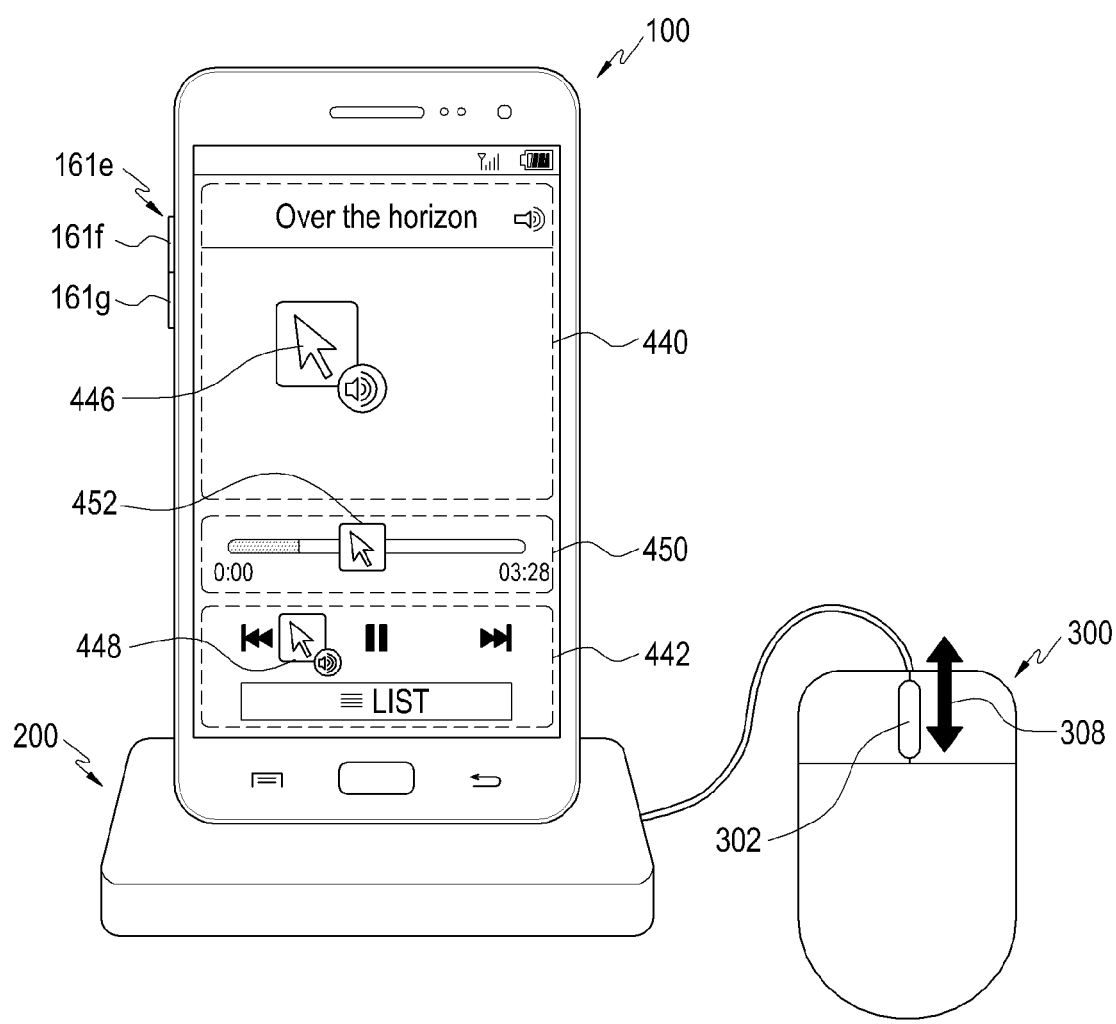
FIG. 10 is a diagram illustrating the mobile device according to another embodiment.

FIG. 9 is a flowchart illustrating a method of controlling the mobile device according to another embodiment. FIG. 10 is a diagram illustrating the mobile device according to another embodiment.

Referring to FIG. 9, according to the method of controlling the mobile device according to an embodiment, the input signal generated by the external input device is received from the docking station through the first connector of the mobile device in step S210. Referring to FIG. 10, the device 100 is detachably connected with the docking station 200 to receive the input signal generated by the external input device 300. The external input device may be, for example, the mouse 300. Further, the input signal may be a signal associated with the movement of the mouse 300. Accordingly, the first controller 110 of the mobile device can receive the signal associated with the movement of the mouse 300 through the docking station 200. The first controller 110 can receive the signal associated with the movement of the mouse through the first connector included in the mobile device connected with the second connector of the docking station.

Thereafter, the cursor displayed on the screen of the mobile device is moved by using the input signal in step S220. The first controller 110 of the mobile device can execute the pre-stored function, corresponding to the input signal generated by the external input device 300. The pre-stored function may be a function of moving a cursor 446 displayed on the touch screen 190 of the mobile device. Accordingly, the first controller 110 may receive the input signal generated according to the movement of the mouse, corresponding to the external input device 300 to move the cursor.

Thereafter, the pre-stored function changed according to an area where the cursor is located on the screen of the mobile device is executed in step S230. The first controller 110 can execute the pre-stored function changed according to the area where the cursor is located on the screen. For example, referring to FIG. 10, the area on the screen may be divided into an area where the scroll is possible (hereinafter, referred to as a "scroll area") and an area where the scroll is not possible (hereinafter, referred to as a "non-scroll area"). For example, the changed pre-stored function may be the volume control button 161*e* when the cursor is located on the non-scroll area 440 or 442, and may be the scroll area corresponding to an increase or decrease of a particular item when the cursor is located on the scroll area 450. More specifically, FIG. 10 shows the screen where the music application is executed in the mobile device. At this time, the non-scroll areas 440 and 442 correspond to area where no item to be scrolled exists on the touch screen 190 of the mobile device. Accordingly, when the cursor 446 or 448 is located on the non-scroll area 440 or 442, the changed pre-stored function may be, for example, the same function as that of the volume control button 161*e*. Further, the external input device 300 may be the mouse, and the input signal generated by the mouse may be wheel scrolling 308. Accordingly, when the cursor 446 or 448 is located on the non-scroll are 440 or 442, the first controller 110 may receive the wheel scrolling 308, which is the input signal of the mouse 300 corresponding to the external input device through the docking station 200 to control the volume, in accordance with the wheel scroll corresponding to the input signal. For example, the first controller 110 performs the same function as that of the volume increase button 161*f* of the mobile device when the input signal corresponds to the up wheel scrolling, and performs the same function as that of the volume decrease button 161*g* of the mobile device when the input signal corresponds to the down wheel scrolling. Further, in FIG. 10, the scroll area 450 is an area where the item to be scrolled exists on the touch screen 190 of the mobile device. At this time, the item to be scrolled may be an item of scrolling a reproduction position (time) of the reproduced music. Accordingly, when the cursor 452 is located on the scroll area 450, the changed pre-stored function corresponding to the input signal may be a function of scrolling the reproduction position. Therefore, when the cursor 452 is located on the scroll area 450, the first controller 110 can receive the wheel scroll 308 corresponding to the input signal of the mouse 300 which is the external input device through the docking station 200, and scroll the reproduction position in accordance with the wheel scroll corresponding to the input signal For example, the first controller 110 can move the reproduction position forward when the received input signal corresponds to the up wheel scrolling, and move the reproduction position backward when the received input signal corresponds to the down wheel scrolling.

Figure 11:
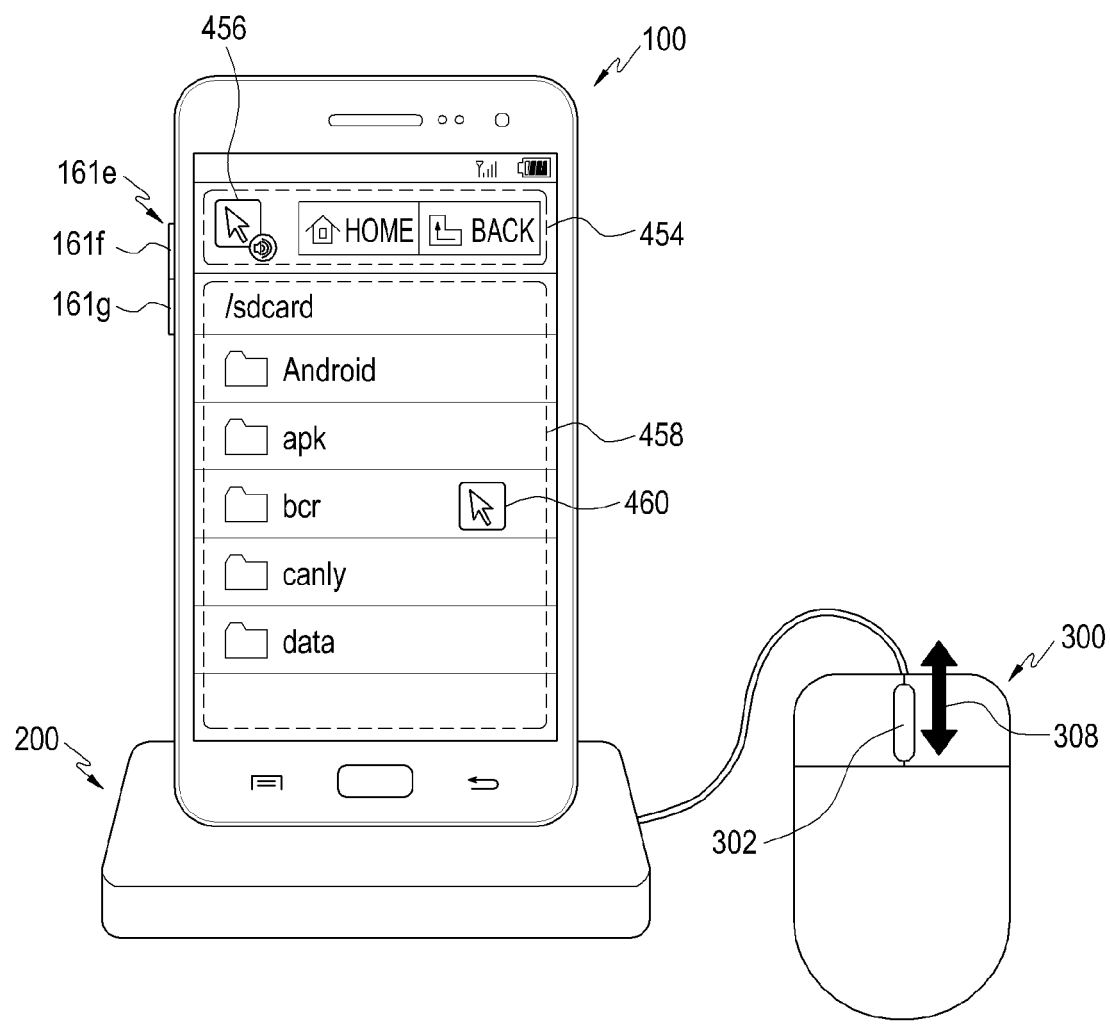
FIG. 11 is a diagram illustrating a screen showing an execution of my file application in a mobile device.

As another example, FIG. 11 shows a screen where a file application is executed in the mobile device. At this time, the non-scroll area 454 is an area where no item to be scrolled exists on the touch screen 190 of the mobile device. Accordingly, when a cursor 456 is located on the non-scroll area 454, the changed pre-stored function may be, for example, the same function as that of the volume control button 161e. Further, the external input device 300 may be the mouse, and the input signal generated by the mouse may be the wheel scroll 308. Accordingly, when the cursor 456 is located on the non-scroll area 440 or 442, the first controller 110 can receive the wheel scroll 308 corresponding to the input signal of the mouse 300 which is the external input device through the docking station 200, and control the volume in accordance with the wheel scroll corresponding to the input signal. For example, the first controller 110 performs the same function as that of the volume increase button 161f of the mobile device when the input signal corresponds to the up wheel scrolling, and performs the same function as that of the volume decrease button 161g of the mobile device when the input signal corresponds to the down wheel scrolling. Further, in FIG. 11, a scroll area 458 is an area where an item to be controlled exists on the touch screen 190 of the mobile device. The item to be scrolled may be a list of one or more files or folders stored in the file. Accordingly, when a cursor 460 is located on the scroll area 458, the changed pre-stored function corresponding to the input signal may be a function of scrolling the list of the one or more files or folders. Therefore, when the cursor 460 is located on the scroll area 450, the first controller 110 can receive the wheel scroll 308 corresponding to the input signal of the mouse 300 which is the external input device through the docking station 200, and scroll the list of the one or more files or folders in accordance with the wheel scroll corresponding to the input signal. For example, the first controller 110 can upwardly scroll the list of the one or more files or folders when the received input signal corresponds to the up wheel scrolling, and downwardly scroll the list of the one or more files or folders when the received input signal corresponds to the down wheel scrolling.

Figure 12:
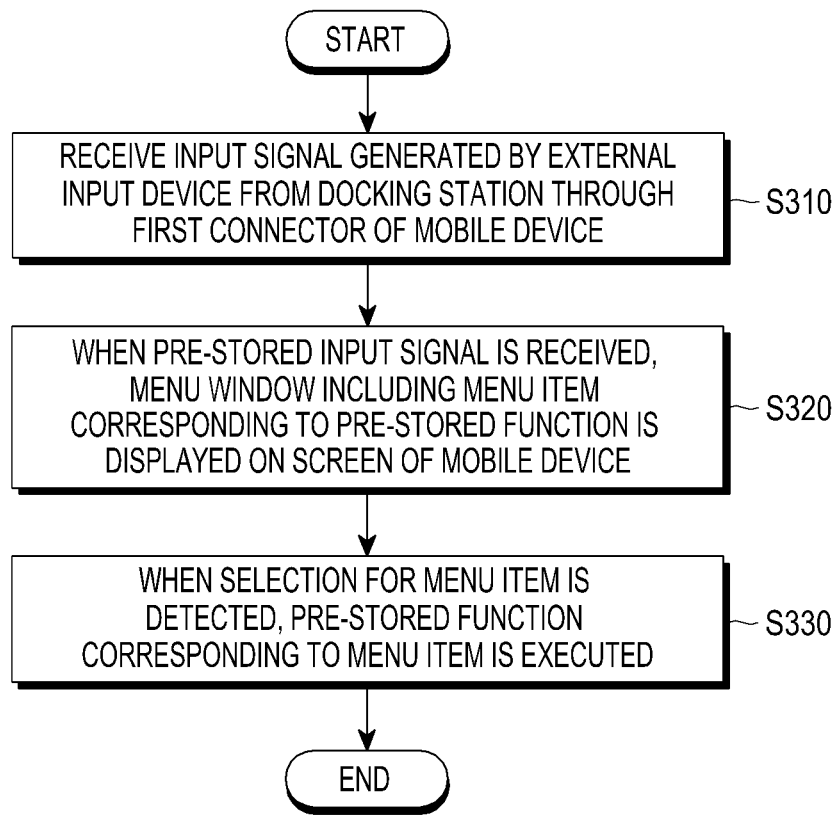
FIG. 12 is a flowchart illustrating the method of controlling the mobile device according to another embodiment.
Figure 13:
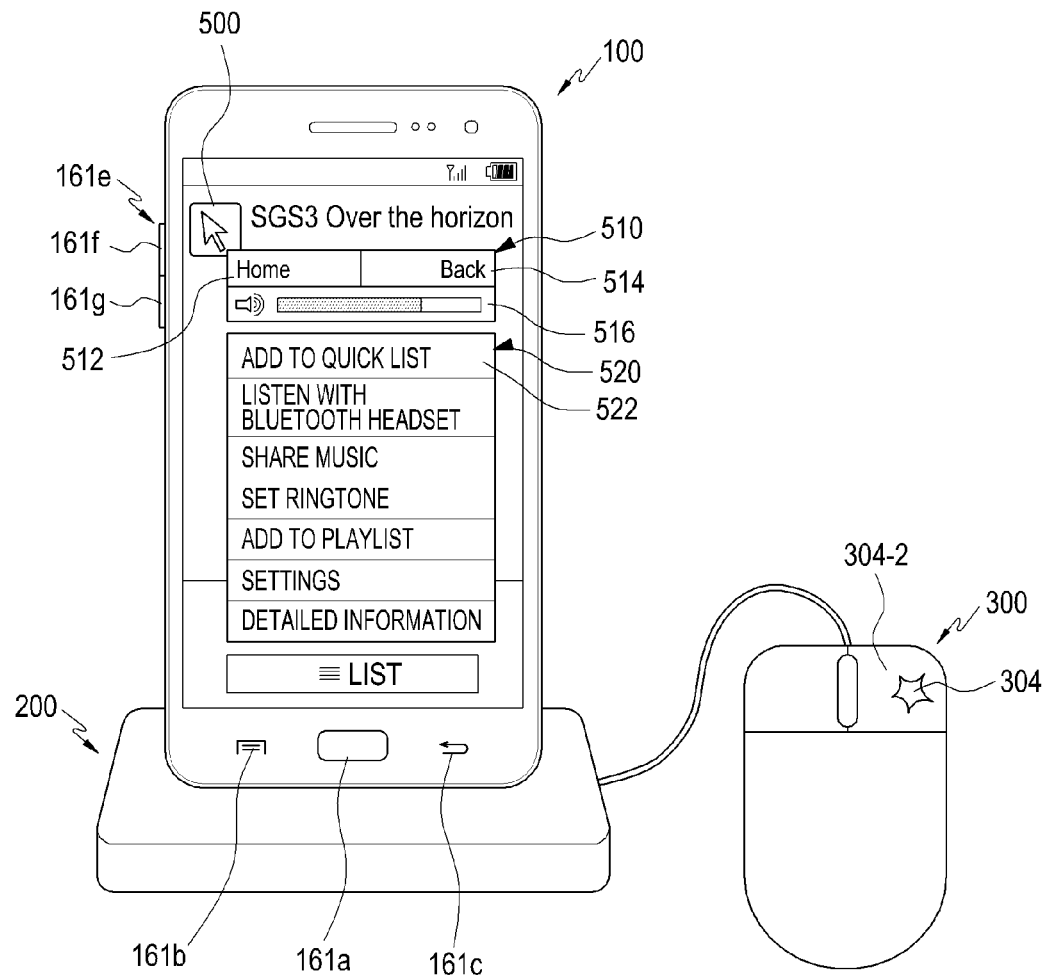
FIG. 13 is a diagram illustrating a mobile device according to still another embodiment.

FIG. 12 a flowchart illustrating a method of controlling the mobile device according to still another embodiment. FIG. 13 is a diagram illustrating the mobile device according to still another embodiment.

Referring to FIG. 12, according to the method of controlling the mobile device according to still another embodiment of the present invention, the input signal generated by the external input device is first received from the docking station through the first connector of the mobile device in step S310. Referring to FIG. 13, the device 100 may be detachably connected with the docking station 200 to receive the input signal generated by the external input device 300. The external input device may be, for example, the mouse 300. Further, the input signal may be at least one of a movement of the mouse 300, a right click, a left click, a wheel scroll, and a wheel click. Accordingly, the first controller 110 of the mobile device can receive the input signal of the mouse 300 through the docking station 200. At this time, the first controller 110 can receive the input signal of the mouse through the first connector included in the mobile device connected with the second connector of the docking station.

Thereafter, when a pre-stored input signal is received, a menu window including a menu item corresponding to a pre-stored function is displayed on the screen of the mobile device in step S320. The first controller 110 can detect whether the pre-stored input signal is received. When the external input device is the mouse 300, the pre-stored input signal may be, for example, the right click 304-2. Accordingly, the first controller 110 can detect whether the right click corresponding to the pre-stored input signal is transmitted. The first controller 110 detects that the right click corresponding to the pre-stored input signal has been transmitted, the first controller 110 can display the menu window including the menu item corresponding to the pre-stored function on the screen of the mobile device. At this time, the pre-stored function may include one or more of the same functions as those performed by the button of the mobile device. Accordingly, the menu window including the menu item corresponding to the pre-stored function may be a menu window including a menu item corresponding to the same function as that of the button of the mobile device. Referring to FIG. 13, menu windows 510 and 520 including menu items corresponding to the same functions as those of the button of the mobile device are illustrated as the menu windows including the menu items corresponding to the pre-stored functions. Among the menu windows, the first menu window 510 may include menu items 512, 514, and 516 corresponding to the same functions as those of the home button 161a, the back button 161c, and the volume control button 161e of the buttons of the mobile device, and the menu items correspond to a home button item 512, a back button item 514, and a volume control button item 516, respectively. Further, among the menu windows, the second menu window 520 may include connection menus as menu items 522 corresponding to the same functions as those of the menu button 161b of the button of the mobile device. The connection menus corresponding to the same functions of the menu button may be, for example, adding to a quick list, listening with a Bluetooth headset, sharing music, setting a ringtone, adding to a playlist, settings, detailed information, etc., in a state where the music application is executed, as illustrated in FIG. 13.

When a selection for the menu item is detected, the pre-stored function corresponding to the menu item is executed in step S330. The first controller 110 can detect the selection for the menu function. For example, when the external input device is the mouse 300, the first controller 110 can receive input signals corresponding to the movement and the left click through the docking station 200, and detect the selection for the menu item. In other words, a position of a cursor 500 displayed on the touch screen 190 of the mobile device can be changed by detecting the input signal corresponding to the movement of the mouse. Further, the first controller 110 can receive the input signal corresponding to the left click of the mouse and the left click for the menu items 512 to 516 and 522, and detect the selection of the menu items 512 to 516 and 522. When the first controller 110 detects the selection for the menu items, the pre-stored functions corresponding to the menu items can be executed. For example, when the selected menu item is the home button item 512, the first controller 110 can execute the same function as that performed by pressing the home button. According to the mobile device corresponding to still another embodiment, the menu item may be selected corresponding to the button displayed on the screen of the mobile device through the external input device, and executing the same function as that of the button.

Figure 14:
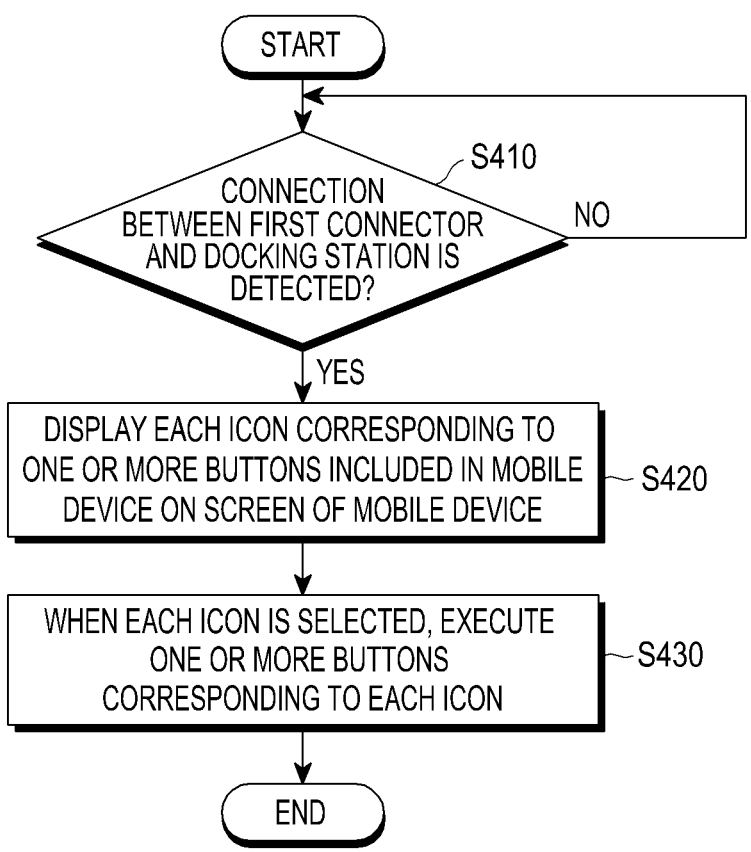
FIG. 14 is a flowchart illustrating a method of controlling the mobile device according to still another embodiment.
Figure 15:
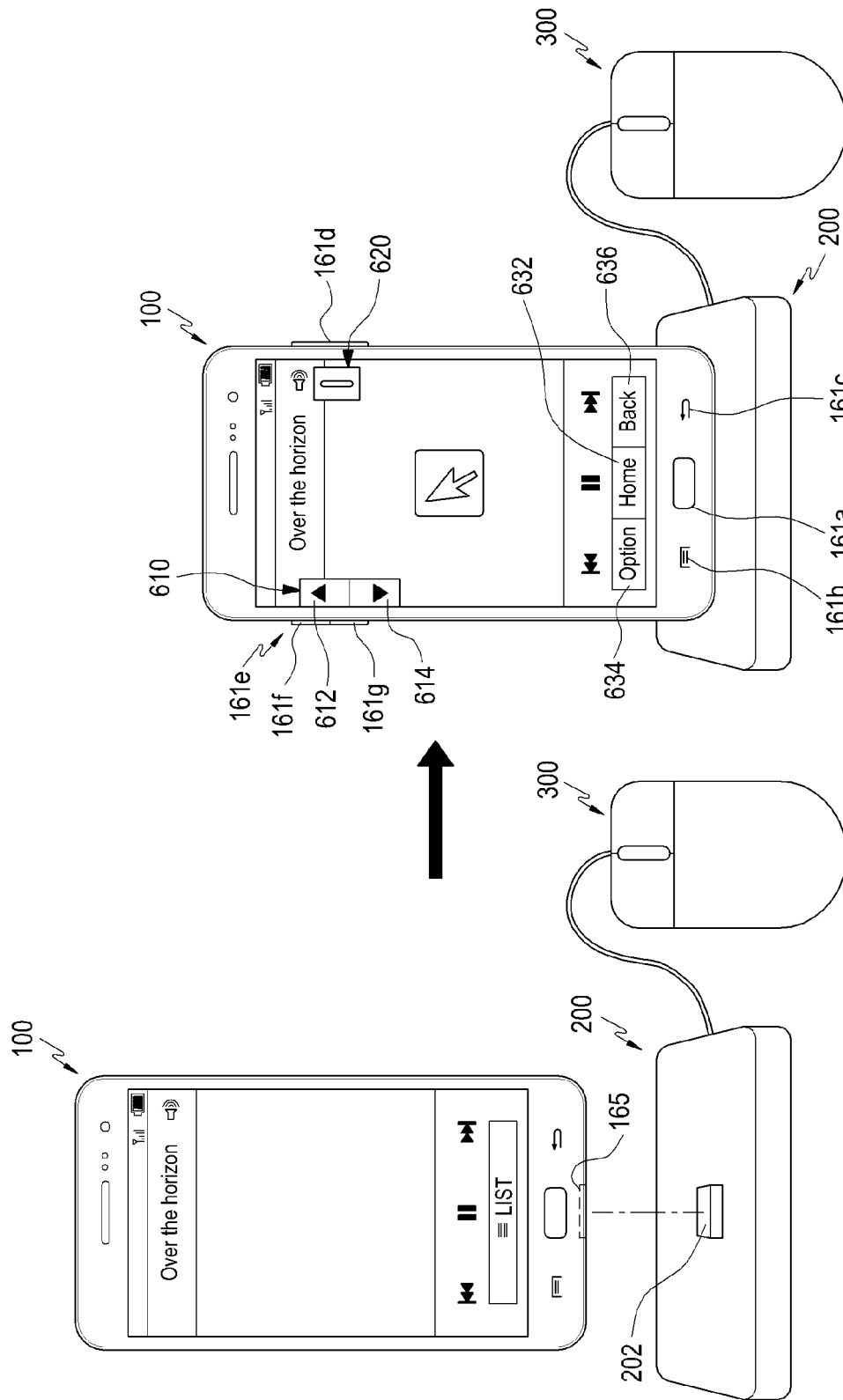
FIGS. 15A and 15B are diagrams illustrating a mobile device according to yet another embodiment.

FIG. 14 is a flowchart illustrating a method of controlling the mobile device according to yet another embodiment. FIG. 15 is a diagram illustrating the mobile device according to yet another embodiment.

Referring to FIG. 14, according to the method of controlling the mobile device according to yet another embodiment, connection between the first connector and the docking station is first detected in step S410. The first controller 110 of the device 100 can detect the connection between the first connector and the docking station 200. Referring to FIG. 15A, the first controller 110 can detect that the first connector 165 of the device 100 is connected with the second connector 202 of the docking station 200.

Thereafter, when the first connector of the mobile device detects the connection between the first connector and the docking station, each icon corresponding to at least one function in the mobile device is displayed on the screen of the mobile device in step S420. The first controller 110 can display each icon corresponding to at least one function (or button) of the mobile device on the touch screen 190. Referring to FIG. 15B, each icon corresponding to at least one function (or button) is displayed on the touch screen 190. In other words, the first controller 110 can display a volume control icon 610 corresponding to the volume control button 161*e*, a power icon 620 corresponding to the power button 161*d*, a home button icon 632 corresponding to the home button 161*a*, a menu button icon 634 corresponding to the menu button 161*b*, and a back button icon 636 corresponding to the back button 161*c* on the screen.

Thereafter, a function of at least one button corresponding to each icon is executed when each icon is selected in step S430. The first controller 110 can detect a selection for each icon. For example, when the external input device is the mouse 300, the first controller 110 can receive input signals corresponding to a movement and a left click through the docking station 200, and detect the selection for each icon. In other words, a position of the cursor 500 displayed on the touch screen 190 of the mobile device can be changed by detecting the input signal corresponding to the movement of the mouse. Further, the first controller 110 can receive the input signal corresponding to the left click of the mouse, and the left click corresponding to each of the icons 610 to 636, to detect the selection of each of the icons 610 to 636. When the first controller 110 detects the selection corresponding to the icons 610 to 636, the same functions stored as those of the buttons corresponding to the icons 610 to 636 can be executed. For example, when the selected icon is the home button icon 632, the first controller 110 can execute the same function as that performed by pressing the home button. According to the mobile device corresponding to yet another embodiment, the menu item can be selected corresponding to the button displayed on the screen of the mobile device through the external input device, and executing the same function as that of the button.

Figure 16:
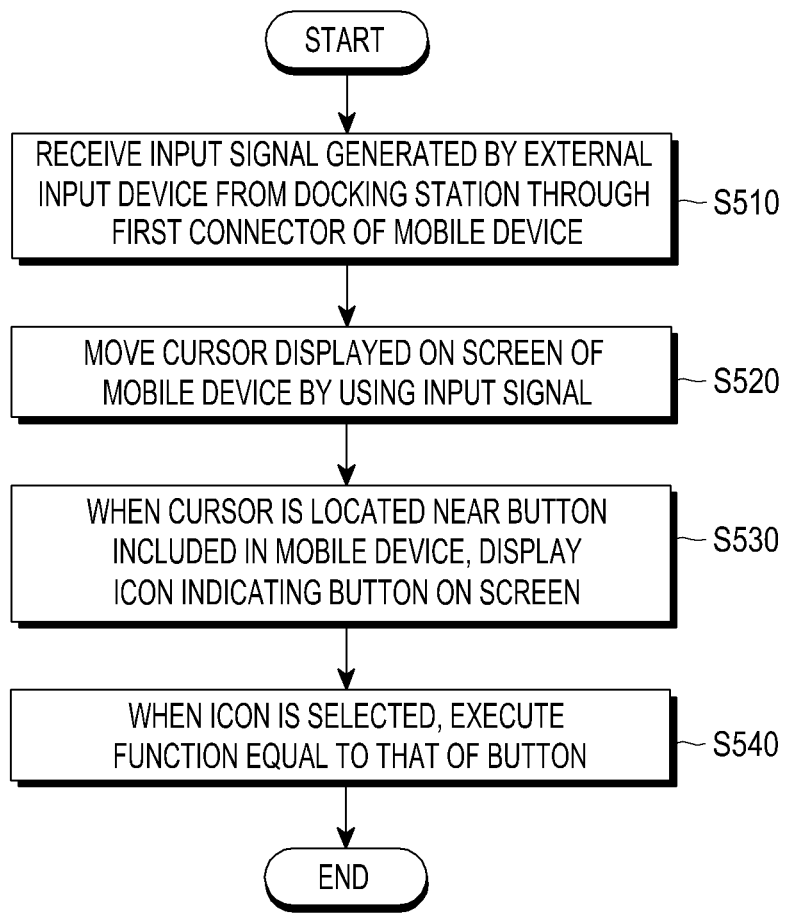
FIG. 16 is a flowchart illustrating a method of controlling the mobile device according to yet another embodiment.
Figure 17:
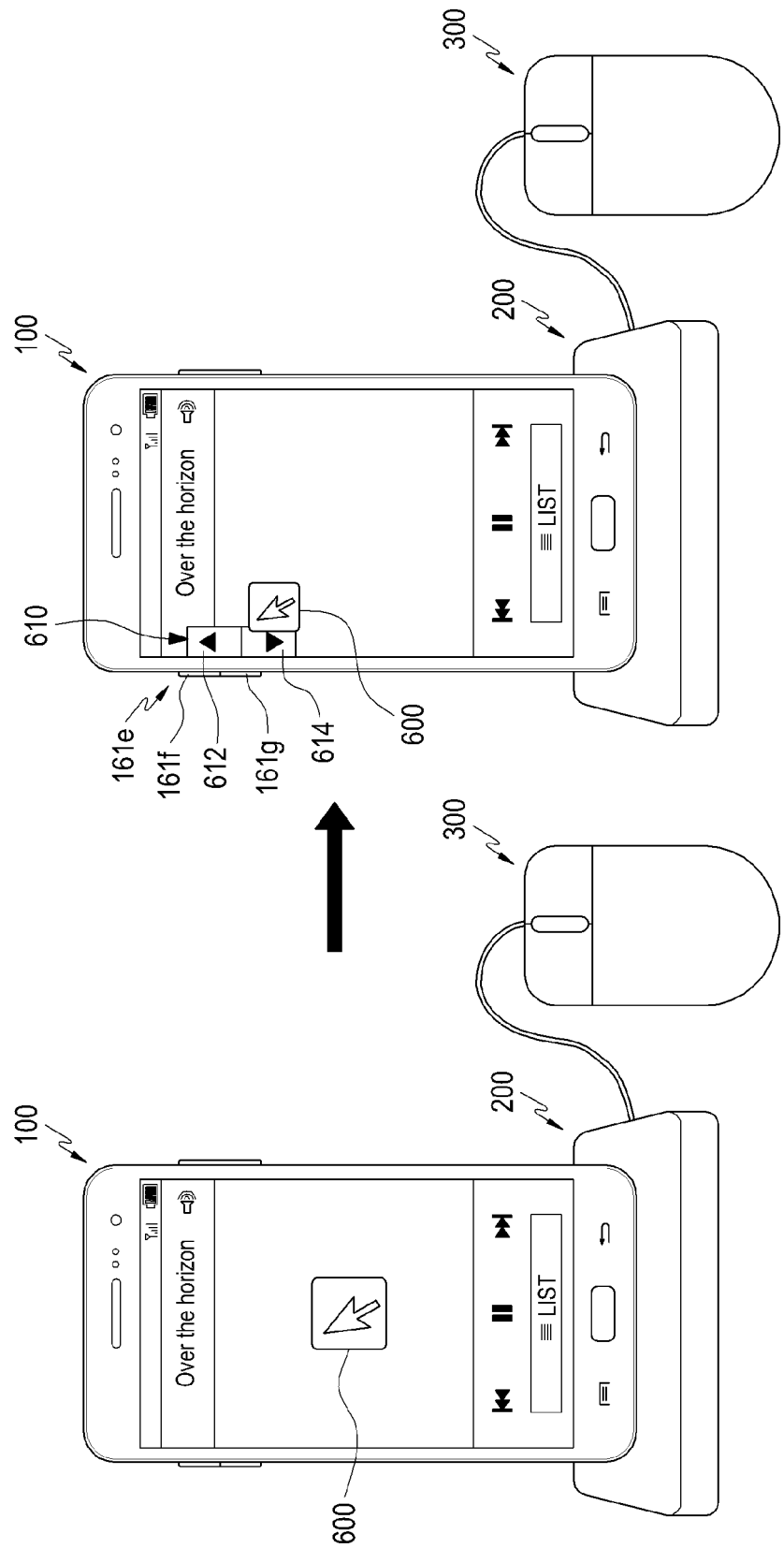
FIGS. 17A and 17B are diagrams illustrating a mobile device according to still yet another embodiment.

FIG. 16 is a flowchart illustrating a method of controlling the mobile device according to still yet another embodiment. FIG. 17 is a diagram illustrating the mobile device according to still yet another embodiment.

Referring to FIG. 16, according to the method of controlling the mobile device according to still yet another embodiment, the input signal generated by the external input device is received from the docking station through the first connector of the device in step S510. Referring to FIG. 17, the device 100 may be detachably connected with the docking station 200 to receive the input signal generated by the external input device 300. At this time, the external input device may be, for example, the mouse 300. Further, the input signal may be at least one of a movement of the mouse 300, a right click, a left click, a wheel scroll, and a wheel click. Accordingly, the first controller 110 of the mobile device can receive the input signal of the mouse 300 through the docking station 200. At this time, the first controller 110 can receive the input signal of the mouse through the first connector included in the mobile device connected with the second connector of the docking station.

Thereafter, a cursor displayed on the screen of the mobile device is moved by using the input signal in step S520. For example, the first controller 110 can move the cursor on the screen by receiving the input signal generated by the mouse 300 which is the external input device. At this time, the input signal may be a signal corresponding to a movement of the mouse 300. Accordingly, the first controller 110 can move a cursor 600 on the screen by using the signal associated with the movement of the mouse 300.

Thereafter, when the cursor is located just near the button included in the mobile device, the icon indicating the button is displayed on the screen in step S530. The first controller 110 can detect that the cursor 600 is located near the button. At this time, when the cursor 600 is located near the button, the first controller 600 can display the icon indicating the button on the screen. For example, the first controller 110 can display the volume control icon 610 corresponding to the volume control button 161*e*, the power icon 620 corresponding to the power button 161*d*, the home button icon 632 corresponding to the home button 161*a*, the menu button icon 634 corresponding to the menu button 161*b*, and the back button icon 636 corresponding to the back button 161*c* on the screen. For example, FIG. 17B illustrates an example where when the first controller 110 detects that the cursor 600 is located near the volume control button 161*e*, the first controller 110 displays the volume control icon 610 corresponding to the volume control button 161*e* on the screen.

When the icon is selected, the same function as that of the button is executed in step S540. The first controller 110 can detect the selection corresponding to the icon. For example, when the external input device is the mouse 300, the first controller 110 can detect the selection corresponding to the icon by receiving input signals, corresponding to a movement and a left click through the docking station 200. In other words, a position of the cursor 600 displayed on the touch screen 190 of the mobile device can be changed by detecting the input signal, corresponding to the movement of the mouse. Further, the first controller 110 can detect the selection of the icon 610 by receiving the input signal corresponding to the left click of the mouse, for example, receiving the left click corresponding to the icon 610. When the first controller 110 detects the selection corresponding to the icon 610, the first controller 110 can execute the same function as that of the button corresponding to the icon 610. For example, when the selected icon 610 is the volume control button, the first controller 110 can execute the same function as that performed by pressing the volume control button. In other words, the first controller 110 can increase the volume of the mobile device when a volume increase button icon 612 of the volume control button icon 610 is selected, and decrease the volume of the mobile device when a volume decrease button icon 614 of the volume control button icon 610 is selected. According to the mobile device corresponding to the still yet another embodiment, the same function may be executed as that of the button, by selecting the icon generated on the screen by locating the cursor displayed on the screen of the mobile device through the external input device.

Figure 18:
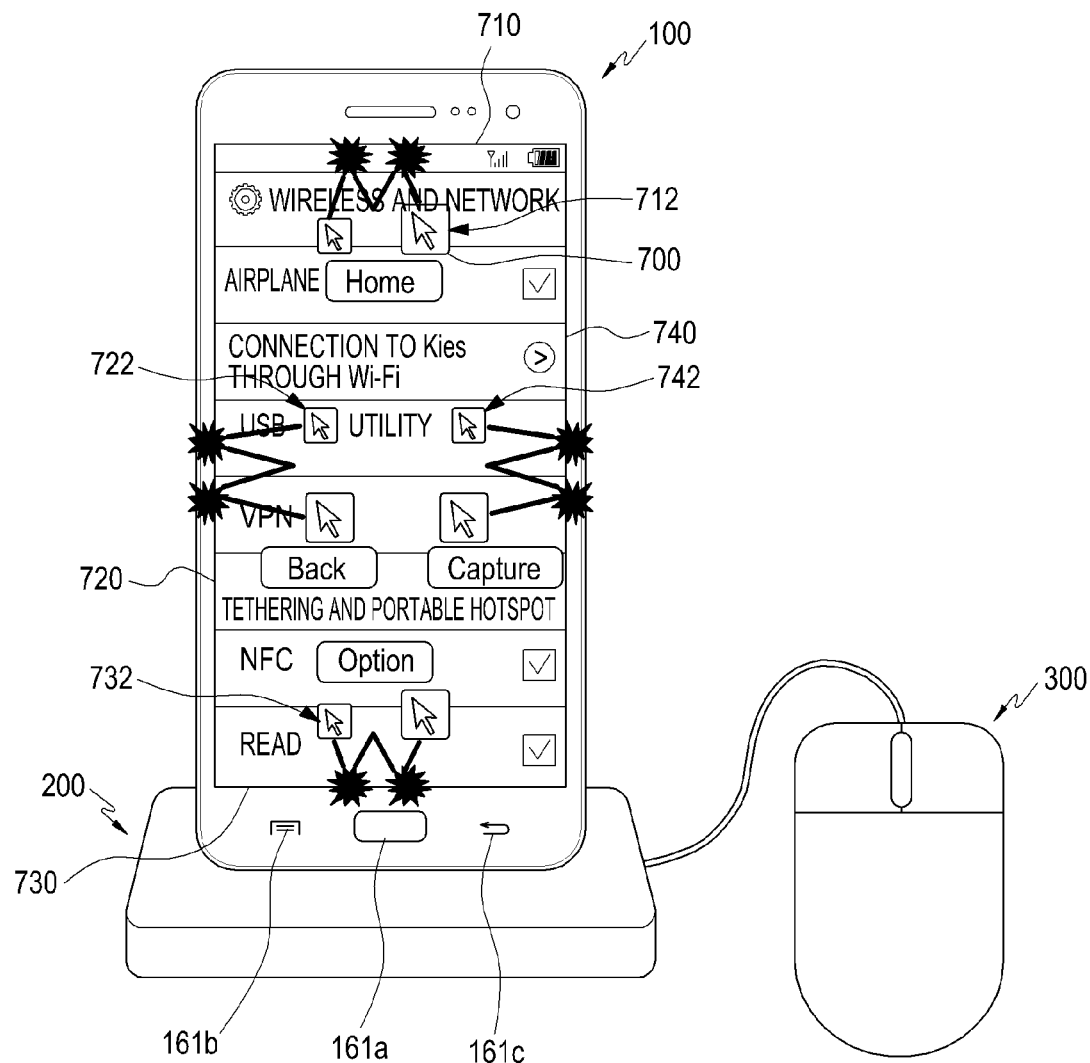
FIG. 18 is a diagram illustrating a mobile device according to a further embodiment.

FIG. 18 is a diagram illustrating the mobile device according to a further embodiment.

Referring to FIG. 18, the first controller 110 of the device 100 can receive the input signal generated by the external input device, for example, the mouse 300 through the docking station 200. At this time, the input signal may be a signal corresponding to a movement of the mouse 300. Accordingly, the first controller 110 can move a cursor 700 displayed on the touch screen 190 of the device 100, according to the signal corresponding to the movement of the mouse 300. Further, the first controller 110 can execute a pre-stored function corresponding to the input signal. The input signal may allow the cursor displayed on the touch screen of the mobile device to touch an edge of the touch screen. The touch may be at least one touch. For example, as illustrated in FIG. 18, the input signal may correspond to touching an edge 170 of an upper end of the touch screen at least one time. A pre-stored function, corresponding to the input signal 712 of touching the edge 710 of the upper end of the screen at least one time, may be the same function as that of the home button 161a. Accordingly, when the first controller 110 detects the input signal 712 of touching the edge 710 of the upper end of the screen at least one time, the first controller 110 can execute the same function as that performed by pressing the home button 161a.

Further, for example, as illustrated in FIG. 18, the input signal may correspond to touching an edge 720 of a left side of the screen at least one time. Further, a pre-stored function, corresponding to the input signal 722 of touching the edge 720 of the left side of the screen at least one time, may be the same function as that of the back button 161b. Accordingly, when the first controller 110 detects the input signal 722 of touching the edge 720 of the left side of the screen, the first controller 110 can execute the same function as that performed by pressing the back button 161b.

Further, for example, as illustrated in FIG. 18, the input signal may correspond to touching an edge 730 of a lower end of the touch screen at least one time. Further, a pre-stored function corresponding to the input signal 732 of touching the edge 730 of the lower end of the touch screen may be the same function as that of the menu button 161c. Accordingly, when the first controller 110 detects the input signal 732 of touching the edge 730 of the lower end of the touch screen, the first controller 110 can execute the same function as that performed by pressing the menu button 161c.

Further, for example, as illustrated in FIG. 18, the input signal may correspond to touching an edge 740 of a right side of the touch screen at least one time. Further, a pre-stored function, corresponding to the inputs signal 742 of touching the edge 740 of the right side of the touch screen may be a function of capturing a current screen. Accordingly, when the first controller 110 detects the input signal 742 of touching the edge 740 of the right side of the touch screen, the first controller 110 can execute the function of capturing the current screen.

It may be appreciated that the embodiments can be implemented in software, hardware, or a combination thereof. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the exemplary embodiments. Therefore, embodiments of the exemplary embodiments provide a program including codes for implementing a system or method claimed in any claim of the accompanying claims, and a machine-readable device for storing such a program. Further, this program may be electronically conveyed through any medium such as a communication signal transferred via a wired or wireless connection, and embodiments of the exemplary embodiments appropriately include equivalents thereto.

Further, the mobile device can receive the program from a program providing apparatus connected to the mobile device wirelessly or through a wire and store the received program. The program providing apparatus may include a memory for storing a program containing instructions for performing the embodiments of the exemplary embodiments and information required for the embodiments of the exemplary embodiments, a communication unit for performing wired or wireless communication with the mobile device, and a controller for transmitting the corresponding program to a transmitting/receiving apparatus according to a request of the mobile device or automatically.

What is claimed is:

1. A mobile device for connecting with an external input device, the mobile device comprising:
   a housing including a screen;
   one or more buttons on a surface of the housing;
   a first connector configured to receive an input signal generated by the external input device through a docking station, the first connector being detachably connected with the docking station; and
   at least one processor configured to:
     receive the input signal from the first connector,
     execute a pre-stored function corresponding to the received input signal,
     upon receiving the input signal from the first connector, display each icon corresponding to the one or more buttons included on the surface of the housing of the mobile device on the screen of the mobile device,
     move a cursor displayed on the screen of the mobile device corresponding to the input signal from the first connector, and
     change the pre-stored function in accordance with an area of the screen where the cursor is located,
   wherein the pre-stored function comprises at least one function performed by a corresponding button among the one or more buttons included on the surface of the mobile device.

2. The mobile device of claim 1, wherein the external input device comprises at least one of a mouse device or a keyboard.

3. The mobile device of claim 1, wherein the docking station comprises:
 a second connector which is connected with the first connector of the mobile device;
 a third connector which is connected with the external input device; and
 an additional processor configured to:
  receive an input signal through the third connector from the external input device, and
  transmit the received input signal to the mobile device through the second connector.

4. The mobile device of claim 1,
 wherein the external input device comprises a mouse device including at least one of a first button or a second button,
 wherein an input signal for performing a home button function of the mobile device is generated when the first button is pressed, and
 wherein an input signal for performing a back button function of the mobile device is generated when the second button is pressed.

5. The mobile device of claim 4, wherein the first button of the mouse device is a wheel button, and the second button of the mouse device is a side button.

6. The mobile device of claim 1, wherein the at least one processor is further configured to:
 display a menu window including a menu item corresponding to the pre-stored function on the screen of the mobile device when receiving a pre-stored input signal, and
 execute the pre-stored function corresponding to the menu item when detecting a selection of the menu item.

7. The mobile device of claim 1, wherein the at least one processor is further configured to:
 receive the input signal from the first connector when the first connector is connected with the docking station, and
 execute the at least one function corresponding to the each icon when the each icon is selected.

8. The mobile device of claim 1, wherein the at least one processor is further configured to:
 display an icon indicating a button on the screen when the cursor is located near the button included in the mobile device, and
 execute a function which is equivalent to the button when the icon is selected.

9. The mobile device of claim 1, wherein the input signal allows the cursor displayed on the screen of the mobile device to touch an edge of the screen.

10. A method for controlling a mobile device which is configured to be detachably connected to an external input device, the mobile device including a screen and one or more buttons on a surface of the housing, the method comprising:
 receiving an input signal generated by the external input device through a docking station, at a first connector of the mobile device;
 executing a pre-stored function corresponding to the received input signal;
 upon receiving the input signal generated by the external input device, displaying each icon corresponding to the one or more buttons included on the surface of a housing of the mobile device on the screen of the mobile device;
 moving a cursor displayed on the screen of the mobile device corresponding to the input signal; and
 changing the pre-stored function in accordance with an area of the screen where the cursor is located,
 wherein the pre-stored function comprises at least one function performed by a corresponding button among the one or more buttons included on the surface of the mobile device.

11. The method of claim 10, wherein the external input device comprises at least one of a mouse device or a keyboard.

12. The method of claim 10, wherein the docking station is configured to:
 receive an input signal through a third connector from the external input device, and
 transmit the received input signal to the mobile device through a second connector which is connected with the first connector of the mobile device.

13. The method of claim 10,
 wherein the external input device is a mouse device including at least one of a first button or a second button,
 wherein an input signal for performing a home button function of the mobile device is generated when the first button is pressed, and
 wherein an input signal for performing a back button function of the mobile device is generated when the second button is pressed.

14. The method of claim 13,
 wherein the first button of the mouse device comprises a wheel button, and
 wherein the second button of the mouse device comprises a side button.

15. The method of claim 10, further comprising:
 displaying a menu window including a menu item corresponding to the pre-stored function on the screen of the mobile device when a pre-stored input signal is received; and
 executing the pre-stored function corresponding to the menu item when a selection of the menu item is detected.

16. The method of claim 10, further comprising:
 detecting a connection between the first connector and the docking station;
 receive the input signal from the first connector when the connection between the first connector and the docking station is detected; and
 executing the at least one function corresponding to the each icon when the each icon is selected.

17. The method of claim 10, further comprising:
 moving the cursor displayed on the screen of the mobile device corresponding to the input signal;
 displaying an icon indicating a button on the screen when the cursor is located near the button included in the mobile device; and
 executing a function which is equivalent to the button when the icon is selected.

18. The method of claim 10, wherein the input signal allows the cursor displayed on the screen of the mobile device to touch an edge of the screen.

* * * * *